United States Patent
Feng et al.

(10) Patent No.: US 11,200,669 B2
(45) Date of Patent: Dec. 14, 2021

(54) SYSTEMS AND METHODS FOR DETERMINING PLASMA INPUT FUNCTION USED IN POSITRON EMISSION TOMOGRAPHY IMAGING

(71) Applicant: UIH AMERICA, INC., Houston, TX (US)

(72) Inventors: Tao Feng, Houston, TX (US); Hongdi Li, Houston, TX (US)

(73) Assignee: UIH AMERICA, INC., Houston, TX (US)

(*) Notice: Subject to any disclaimer, the term of this patent is extended or adjusted under 35 U.S.C. 154(b) by 101 days.

(21) Appl. No.: 16/687,845

(22) Filed: Nov. 19, 2019

(65) Prior Publication Data

US 2021/0150705 A1 May 20, 2021

(51) Int. Cl.
*G06T 7/00* (2017.01)
*G06T 5/00* (2006.01)

(52) U.S. Cl.
CPC ............ *G06T 7/0012* (2013.01); *G06T 5/002* (2013.01); *G06T 2207/10104* (2013.01); *G06T 2207/20081* (2013.01); *G06T 2207/30101* (2013.01)

(58) Field of Classification Search
None
See application file for complete search history.

(56) References Cited

U.S. PATENT DOCUMENTS 9,087,147 B1 * 7/2015 Fonte .................... A61B 34/10
9,262,824 B2 * 2/2016 Pagel ................... G06T 7/0012
10,438,380 B2 * 10/2019 Hu ......................... G06T 11/006
2005/0063611 A1 * 3/2005 Toki ....................... G06T 3/4053
382/299
2017/0109880 A1 * 4/2017 Al-Kofahi ............... G06T 7/143

FOREIGN PATENT DOCUMENTS

CN        110298897 A   * 10/2019  ........... G06T 11/008
WO   WO-2005116647 A2  * 12/2005  ............... G06T 7/20
WO   WO-2018133118 A1  * 7/2018  ........... G06T 7/0016

OTHER PUBLICATIONS

Machine translation of CN-110298897-A (Year: 2019).*
Machine translation of WO-2018133118-A1 (Year: 2018).*

* cited by examiner

*Primary Examiner* — Vu Le
*Assistant Examiner* — Courtney Joan Nelson
(74) *Attorney, Agent, or Firm* — Metis IP LLC

(57) ABSTRACT

The present disclosure provides a system and method for image generation. The method may include obtaining a first image acquired by an imaging device. The first image may include a representation of a blood vessel of a subject based on a tracer. The method may further include obtaining a blood vessel model configured to provide one or more constraints regarding one or more characteristics of the blood vessel. The method may further include generating a second image including a representation of the blood vessel based on the blood vessel model and the first image. An image resolution of the second image may be higher than an image resolution of the first image. The presentation of the blood vessel in the second image may satisfy at least one of the one or more constraints.

19 Claims, 10 Drawing Sheets

SYSTEMS AND METHODS FOR DETERMINING PLASMA INPUT FUNCTION USED IN POSITRON EMISSION TOMOGRAPHY IMAGING

TECHNICAL FIELD

The disclosure generally relates to positron emission tomography (PET), and more particularly relates to systems and methods for determining a plasma input function in PET imaging.

BACKGROUND

Positron emission tomography (PET) is a nuclear medicine functional imaging technique that is widely used in medical diagnosis. For example, PET parametric images may be indicative of some physiological parameters (also referred to as dynamic parameters) of tracer kinetics, which can aid the evaluation of the physiology (functionality) and/or anatomy (structure) of the target organ or tissue, as well as its biochemical properties. PET parametric images may be usually reconstructed based on a plasma input function derived from images (e.g., dynamic activity images). The plasma input function derived from images may be influenced by the partial volume effect, the positron range effect, etc., which may decrease the accuracy of the plasma input function determined based on such images. Thus it is desired to provide systems and methods for determining a plasma input function with improved accuracy.

SUMMARY

According to a first aspect of the present disclosure, a system is provided. The system may include at least one storage device storing executable instructions, and at least one processor in communication with the at least one storage device. When executing the executable instructions, the at least one processor may cause the system to perform one or more of the following operations. The system may obtain a first image acquired by an imaging device. The first image may include a representation of a blood vessel of a subject based on a tracer. The system may obtain a blood vessel model configured to provide one or more constraints regarding one or more characteristics of the blood vessel. The system may generate, based on the blood vessel model and the first image, a second image including a representation of the blood vessel. An image resolution of the second image may be higher than an image resolution of the first image, and the representation of the blood vessel in the second image may satisfy at least one of the one or more constraints.

In some embodiments, the one or more constraints regarding one or more characteristics of the blood vessel may include at least one of a first constraint, a second constraint, a third constraint, or a fourth constraint. The first constraint may include that a size of the blood vessel exceeds the image resolution of the first image. The second constraint may include that a cross-section of the blood vessel is approximately circular. The third constraint may include that a boundary of the cross-section of the blood vessel is continuous. The fourth constraint may include that a concentration of the tracer in the blood vessel is uniform.

In some embodiments, the image resolution of the first image may be defined by a point spread function (PSF) model. In some embodiments, the generating, based on the blood vessel model and the first image, a second image including a representation of the blood vessel may include generating, based at least in part on the PSF model and the first image, the second image. The second image may be converted into the first image using the PSF model.

In some embodiments, the generating, based at least in part on the PSF model and the first image, the second image including a representation of the blood vessel may include performing an iterative process. Each iteration of the iterative process may include determining, based on the PSF model and the first image, a third image having an image resolution higher than the image resolution of the first image; determining, based on the third image and at least one of the second constraint, the third constraint, or the fourth constraint, an estimated second image; and determining whether a termination condition is satisfied; based on a determination that whether the termination condition is satisfied, updating the first image using the estimated second image in response to the determination that the termination condition is not satisfied, or designating the estimated second image as the second image in response to the determination that the termination condition is satisfied and terminating the iterative process.

In some embodiments, to determine, based on the PSF model and the first image, a third image, the system may perform, based on the PSF model, a deconvolution operation on the first image to obtain the third image.

In some embodiments, to determine, based on the third image and at least one of the second constraint, the third constraint, or the fourth constraint, an estimated second image, the system may determine a pixel value threshold. The system may perform a smoothing operation on a region of the third image to obtain the estimated second image. The region of the third image may include a continuous boundary and a plurality of pixels whose pixel values exceed the pixel value threshold.

In some embodiments, to determine, based on the third image and at least one of the second constraint, the third constraint, or the fourth constraint, an estimated second image, the system may perform, based on a compressed sensing technique, a denoising operation on the third image to obtain the estimated second image.

In some embodiments, the termination condition may relate to an iteration count of the iterative process or a cost function configured to compare a difference between the first image and an estimated first image generated based on the estimated second image and the spatial resolution of the imaging device.

In some embodiments, to generate, based on the blood vessel model and the first image, a second image including a representation of the blood vessel, the system may obtain a trained machine learning model. The system may generate the second image by inputting the first image into the trained machine learning model.

In some embodiments, the trained machine learning model may be generated by a training process including training a machine learning model using multiple groups of training samples. Each group of the multiple groups of training samples may include a specific image and a reference image both associated with a same blood vessel. The reference image may have a higher spatial resolution than the specific image. The specific image may serve as an input of the machine learning model, and the reference image may serve as a desired output of the machine learning model during the training process.

In some embodiments, the training process of the trained machine learning model may include initializing parameter values of the machine learning model; and for each group of the multiple groups of training samples, training the machine learning model by iteratively updating parameter values of the machine learning model.

In some embodiments, the system may obtain one or more fourth images associated with the blood vessel. The system may obtain one or more corrected fourth images or a plasma input function associated with the blood vessel by performing, based on the second image, a partial volume correction on each of the one or more fourth images.

In some embodiments, the one or more fourth images may be acquired by a-PET device via scanning the subject including the blood vessel in one or more consecutive time periods after a radioactive tracer is injected into the subject.

In some embodiments, the one or more fourth images may include the first image, and the first image may be acquired by the PET device via scanning the subject including the blood vessel in a time period earlier than a portion of the one or more consecutive time periods after the radioactive tracer is injected into the subject.

In some embodiments, to obtain one or more corrected fourth images or a plasma input function by performing a partial volume correction on each of the one or more fourth images, the system may obtain a second trained machine learning model for partial volume correction. The system may determine the one or more corrected fourth images or the plasma input function associated with the blood vessel by inputting the second image and the one or more fourth images into the second trained machine learning model.

In some embodiments, the obtaining a second trained machine learning model for partial volume correction may include obtaining multiple groups of second training samples; and generating the second trained machine learning model by training a second machine learning model using the multiple groups of second training samples in a second training process. Each group of the multiple groups of second training samples may include a second specific image, a second reference image generated by performing the partial volume correction on the second specific image, and a particular image. During the second training process, the second specific image and the particular image may serve as an input of the second machine learning model, and the second reference image may serve as a desired output of the second machine learning model.

In some embodiments, the generating the second trained machine learning model for partial volume correction by training a second machine learning model using the multiple groups of second training samples may include initializing parameter values of the second machine learning model; and for each group of the multiple groups of second training samples, training the second machine learning model by iteratively updating parameter values of the second machine learning model.

According to a second aspect of the present disclosure, a method is provided. The method may be implemented on at least one computing device, each of which may include at least one processor and a storage device. The method may include obtaining a first image acquired by an imaging device, the first image including a representation of a blood vessel of a subject based on a tracer; obtaining a blood vessel model configured to provide one or more constraints regarding one or more characteristics of the blood vessel; and generating, based on the blood vessel model and the first image, a second image including a representation of the blood vessel. An image resolution of the second image may be higher than an image resolution of the first image, and the representation of the blood vessel in the second image may satisfy at least one of the one or more constraints.

According to a third aspect of the present disclosure, a non-transitory computer-readable medium storing at least one set of instructions is provided. When executed by at least one processor, the at least one set of instructions may direct the at least one processor to perform a method. The method may include obtaining a first image acquired by an imaging device, the first image including a representation of a blood vessel of a subject based on a tracer; obtaining a blood vessel model configured to provide one or more constraints regarding one or more characteristics of the blood vessel; and generating, based on the blood vessel model and the first image, a second image including a representation of the blood vessel. An image resolution of the second image may be higher than an image resolution of the first image, and the representation of the blood vessel in the second image may satisfy at least one of the one or more constraints Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not scaled. These embodiments are non-limiting exemplary embodiments, in which like reference numerals represent similar structures throughout the several views of the drawings, and wherein.

DETAILED DESCRIPTION

Figure 1:
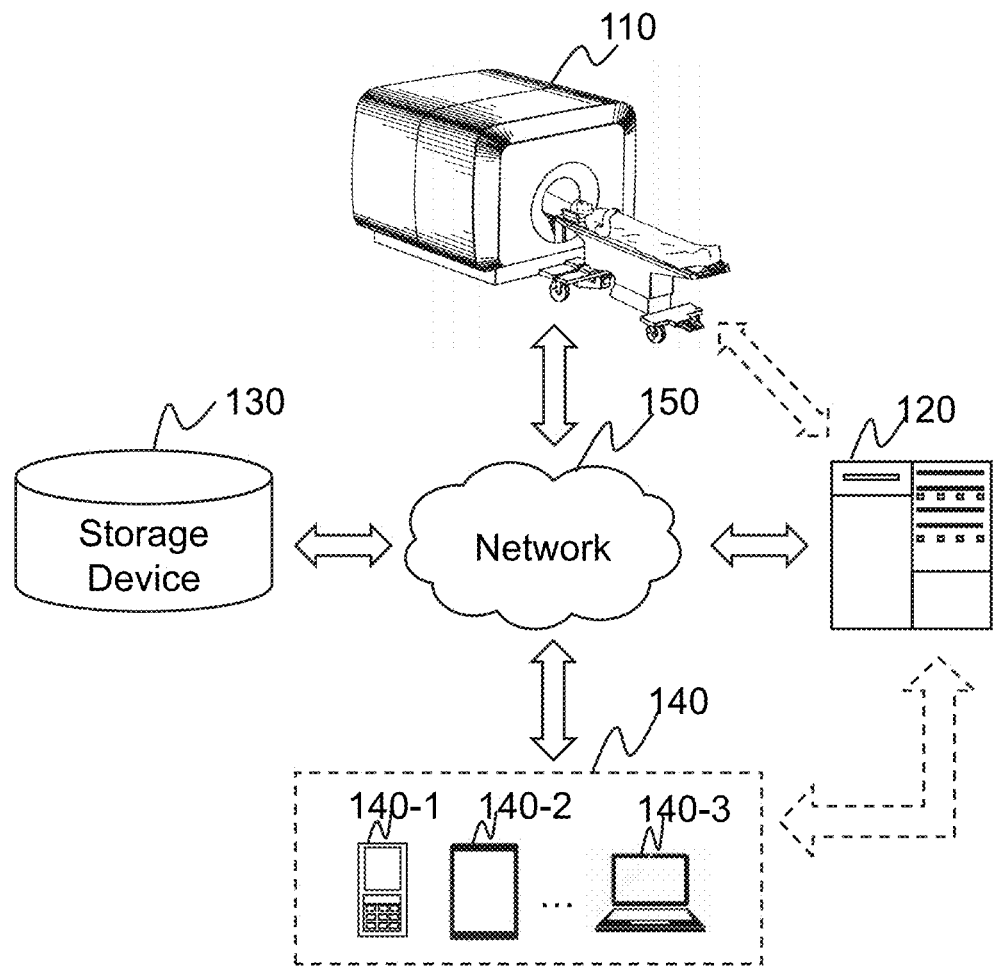
FIG. 1 is a schematic diagram illustrating an exemplary imaging system according to some embodiments of the present disclosure.

The following description is presented to enable any person skilled in the art to make and use the present disclosure and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including" when used in this disclosure, specify the presence of stated features, integers, steps, operations, elements, and/or components, but do not preclude the presence or addition of one or more other features, integers, steps, operations, elements, components, and/or groups thereof.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or other storage devices. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an erasable programmable read-only memory (EPROM). It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that the term "system," "engine," "unit," "module," and/or "block" used herein are one method to distinguish different components, elements, parts, sections or assembly of different levels in ascending order. However, the terms may be displaced by another expression if they achieve the same purpose.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments in the present disclosure. It is to be expressly understood, the operations of the flowchart may be implemented not in order. Conversely, the operations may be implemented in an inverted order, or simultaneously. Moreover, one or more other operations may be added to the flowcharts. One or more operations may be removed from the flowcharts.

Provided herein are systems and methods for generating a high-image resolution image and/or a plasma input function. A system may include at least one storage device storing executable instructions, and at least one processor in communication with the at least one storage device. When executing the executable instructions, the at least one processor may cause the system to obtain a first image acquired by an imaging device. The first image may include a representation of a blood vessel. The at least one processor may also cause the system to obtain a blood vessel model configured to provide one or more constraints to one or more characteristics of the blood vessel. The at least one processor may further cause the system to generate a second image including a representation of the blood vessel based on the blood vessel model and the first image. An image resolution of the second image may be higher than an image resolution of the first image. As used herein, high image resolution and low image resolution are used in a relative sense in which the image resolution of an image with a high image resolution is higher than the image resolution of an image with a low image resolution. In some embodiments, the high image resolution mainly refers to the boundary sharpness and quantitations improvement, not the ability to distinguish finer structures. The representation of the blood vessel in the second image may satisfy at least one of the one or more constraints. Accordingly, the system may convert the first image with a low image resolution into the second image with a high image resolution according to the blood vessel model such that the representation of the blood vessel in the second image satisfies one or more constraints provided by the blood vessel model. As the blood vessel model approximates actual structural and/or functional characteristics of the blood vessel, the second image may provide a representation of a desirable quality and/or image resolution of the blood vessel image. Therefore, the second image with a high image resolution may include more accurate information (e.g., structural information) of the blood vessel, which may improve the accuracy of the plasma input function determined based on the second image. For example, the first image may be a specific PET image, which is one of a plurality of PET images acquired in multiple consecutive time periods after a tracer is injected into the blood vessel. The system may perform a partial volume correction on the plurality of PET images (i.e., dynamic activity images) based on the second image to reduce partial volume effect, thereby obtaining a plasma input function with improved accuracy. Accordingly, the plasma input function with improved accuracy may be used to determine PET parametric images and used for kinetic analysis which in turn may provide more accurate kinetic parameters or pharmacokinetics of a drug.

FIG. 1 is a schematic diagram illustrating an exemplary imaging system according to some embodiments of the present disclosure. In some embodiments, the imaging system 100 may be a single-modality system or a multi-modality system. Exemplary single-modality systems may include a positron emission tomography (PET) system, a single-photon emission computed tomography (SPECT) system, etc. Exemplary multi-modality systems may include a magnetic resonance-positron emission tomography (MR-PET) system, a PET-CT system, etc. In some embodiments, the imaging system 100 may include modules and/or components for performing imaging and/or related analysis.

Merely by way of example, as illustrated in FIG. 1, the imaging system 100 may include a medical device 110, a processing device 120, a storage device 130, one or more terminals 140, and a network 150. The components in the imaging system 100 may be connected in one or more ways. Merely by way of example, the medical device 110 may be connected to the processing device 120 through the network 150. As another example, the medical device 110 may be connected to the processing device 120 directly as illustrated in FIG. 1. As a further example, the terminal(s) 140 may be connected to another component of the imaging system 100 (e.g., the processing device 120) via the network 150. As still a further example, the terminal(s) 140 may be connected to the processing device 120 directly as illustrated by the dotted arrow in FIG. 1. As still a further example, the storage device 130 may be connected to another component of the imaging system 100 (e.g., the processing device 120) directly as illustrated in FIG. 1, or through the network 150.

The medical device 110 may be configured to acquire imaging data relating to at least one part of a subject. The imaging data relating to at least one part of a subject may include an image (e.g., an image slice), projection data, or a combination thereof. In some embodiments, the imaging data may be a two-dimensional (2D) imaging data, a three-dimensional (3D) imaging data, a four-dimensional (4D) imaging data, or the like, or any combination thereof. The subject may be biological or non-biological. For example, the subject may include a patient, a man-made object, etc. As another example, the subject may include a specific portion, organ, and/or tissue of the patient. For example, the subject may include the head, the neck, the thorax, the heart, the stomach, a blood vessel, soft tissue, a tumor, nodules, or the like, or any combination thereof. In some embodiments, the medical device 110 may include a single modality imaging device. For example, the medical device 110 may include a positron emission tomography (PET) device, a single-photon emission computed tomography (SPECT) device, a magnetic resonance imaging (MRI) device (also referred to as an MR device, an MR scanner), a computed tomography (CT) device, or the like, or any combination thereof. In some embodiments, the medical device 110 may include a multi-modality imaging device. Exemplary multi-modality imaging devices may include a PET-CT device, a PET-MRI device, or the like, or a combination thereof. For example, the medical device 110 may include a PET device and an MRI device. The PET device may scan a subject or a portion thereof that is located within its detection region and generate projection data relating to the subject or the portion thereof.

The processing device 120 may process data and/or information obtained from the medical device 110, the terminal(s) 140, and/or the storage device 130. For example, the processing device 120 may obtain a first image acquired by an imaging device (e.g., the medical device 110). The first image may include a representation of a blood vessel (e.g., a carotid artery). The processing device 120 may obtain a blood vessel model configured to provide one or more constraints to one or more characteristics of the blood vessel. The processing device 120 may generate a second image including a representation of the blood vessel based on the blood vessel model and the first image. An image resolution of the second image may be higher than an image resolution of the first image. The presentation of the blood vessel in the second image may satisfy at least one of the one or more constraints. As another example, the processing device 120 may use the second image to correct one or more certain images by performing a partial volume correction on the certain images. In some embodiments, the processing device 120 may obtain a first trained machine learning model for image reconstruction or conversion. The processing device 120 may input the image into the trained machine learning model to generate the second image with a high image resolution than the first image. In some embodiments, the processing device 120 may obtain a second trained machine learning model for image correction. The processing device 120 may perform a partial volume correction on the certain images using the second trained machine learning model.

The trained machine learning model used in the present disclosure (e.g., the first trained machine learning model and/or second trained machine learning model) may be updated from time to time, e.g., periodically or not, based on a sample set that is at least partially different from the original sample set from which the original trained machine learning model is determined. For instance, the trained machine learning model (e.g., the first trained machine learning model and/or second trained machine learning model) may be updated based on a sample set including new samples that are not in the original sample set. In some embodiments, the determination and/or updating of the trained machine learning model (e.g., the first trained machine learning model and/or second trained machine learning model) may be performed on a processing device, while the application of the trained machine learning model may be performed on a different processing device. In some embodiments, the determination and/or updating of the trained machine learning model (e.g., the first trained machine learning model and/or second trained machine learning model) may be performed on a processing device of a system different than the imaging system 100 or a server different than a server including the processing device 120 on which the application of the trained machine learning model is performed. For instance, the determination and/or updating of the trained machine learning model (e.g., the first trained machine learning model and/or second trained machine learning model) may be performed on a first system of a vendor who provides and/or maintains such a machine learning model and/or has access to training samples used to determine and/or update the trained machine learning model, while image generation based on the provided machine learning model may be performed on a second system of a client of the vendor. In some embodiments, the determination and/or updating of the trained machine learning model (e.g., the first trained machine learning model and/or second trained machine learning model) may be performed online in response to a request for image generation. In some embodiments, the determination and/or updating of the trained machine learning model may be performed offline.

In some embodiments, the processing device 120 may be a computer, a user console, a single server or a server group, etc. The server group may be centralized or distributed. In some embodiments, the processing device 120 may be local or remote. For example, the processing device 120 may access information and/or data stored in the medical device 110, the terminal(s) 140, and/or the storage device 130 via the network 150. As another example, the processing device 120 may be directly connected to the medical device 110, the terminal(s) 140 and/or the storage device 130 to access stored information and/or data. In some embodiments, the processing device 120 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

The storage device 130 may store data, instructions, and/or any other information. In some embodiments, the storage device 130 may store data obtained from the terminal(s) 140 and/or the processing device 120. The data may include image data acquired by the processing device 120, algorithms and/or models for processing the image data, etc. For example, the storage device 130 may store image data (e.g., PET images, PET projection data, etc.) acquired by the medical device 110. As another example, the storage device 130 may store one or more algorithms for processing the image data, a trained machine learning model for image generation, etc. In some embodiments, the storage device 130 may store data and/or instructions that the processing device 120 may execute or use to perform exemplary methods/systems described in the present disclosure. In some embodiments, the storage device 130 may include a mass storage, removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memories may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage device 130 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 130 may be connected to the network 150 to communicate with one or more other components in the imaging system 100 (e.g., the processing device 120, the terminal(s) 140, etc.). One or more components in the imaging system 100 may access the data or instructions stored in the storage device 130 via the network 150. In some embodiments, the storage device 130 may be directly connected to or communicate with one or more other components in the imaging system 100 (e.g., the processing device 120, the terminal(s) 140, etc.). In some embodiments, the storage device 130 may be part of the processing device 120.

The terminal(s) 140 may include a mobile device 140-1, a tablet computer 140-2, a laptop computer 140-3, or the like, or any combination thereof. In some embodiments, the mobile device 140-1 may include a smart home device, a wearable device, a mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a bracelet, a footgear, eyeglasses, a helmet, a watch, clothing, a backpack, a smart accessory, or the like, or any combination thereof. In some embodiments, the mobile device may include a mobile phone, a personal digital assistant (PDA), a gaming device, a navigation device, a point of sale (POS) device, a laptop, a tablet computer, a desktop, or the like, or any combination thereof. In some embodiments, the virtual reality device and/or the augmented reality device may include a virtual reality helmet, virtual reality glasses, a virtual reality patch, an augmented reality helmet, augmented reality glasses, an augmented reality patch, or the like, or any combination thereof. For example, the virtual reality device and/or the augmented reality device may include a Google Glass™, an Oculus Rift™, a Hololens™, a Gear VR™, etc. In some embodiments, the terminal(s) 140 may be part of the processing device 120.

The network 150 may include any suitable network that can facilitate the exchange of information and/or data for the imaging system 100. In some embodiments, one or more components of the medical device 110 (e.g., an MRI device, a PET device, etc.), the terminal(s) 140, the processing device 120, the storage device 130, etc., may communicate information and/or data with one or more other components of the imaging system 100 via the network 150. For example, the processing device 120 may obtain data from the medical device 110 via the network 150. As another example, the processing device 120 may obtain user instructions from the terminal(s) 140 via the network 150. The network 150 may be and/or include a public network (e.g., the Internet), a private network (e.g., a local area network (LAN), a wide area network (WAN)), etc.), a wired network (e.g., an Ethernet™ network), a wireless network (e.g., an 802.11™ network, a Wi-Fi™ network, etc.), a cellular network (e.g., a Long Term Evolution (LTE) network), a frame relay network, a virtual private network ("VPN"), a satellite network, a telephone network, routers, hubs, switches, server computers, and/or any combination thereof. Merely by way of example, the network 150 may include a cable network, a wireline network, a fiber-optic network, a telecommunications network, an intranet, a wireless local area network (WLAN)™, a metropolitan area network (MAN), a public telephone switched network (PSTN), a Bluetooth™ network, a ZigBee™ network, a near field communication (NFC)™ network, or the like, or any combination thereof. In some embodiments, the network 150 may include one or more network access points. For example, the network 150 may include wired and/or wireless network access points such as base stations and/or internet exchange points through which one or more components of the imaging system 100 may be connected to the network 150 to exchange data and/or information.

It should be noted that the above description of the imaging system 100 is merely provided for the purposes of illustration, and not intended to limit the scope of the present disclosure. For persons having ordinary skills in the art, multiple variations and modifications may be made under the teachings of the present disclosure. For example, the assembly and/or function of the imaging system 100 may be varied or changed according to specific implementation scenarios.

Figure 2:
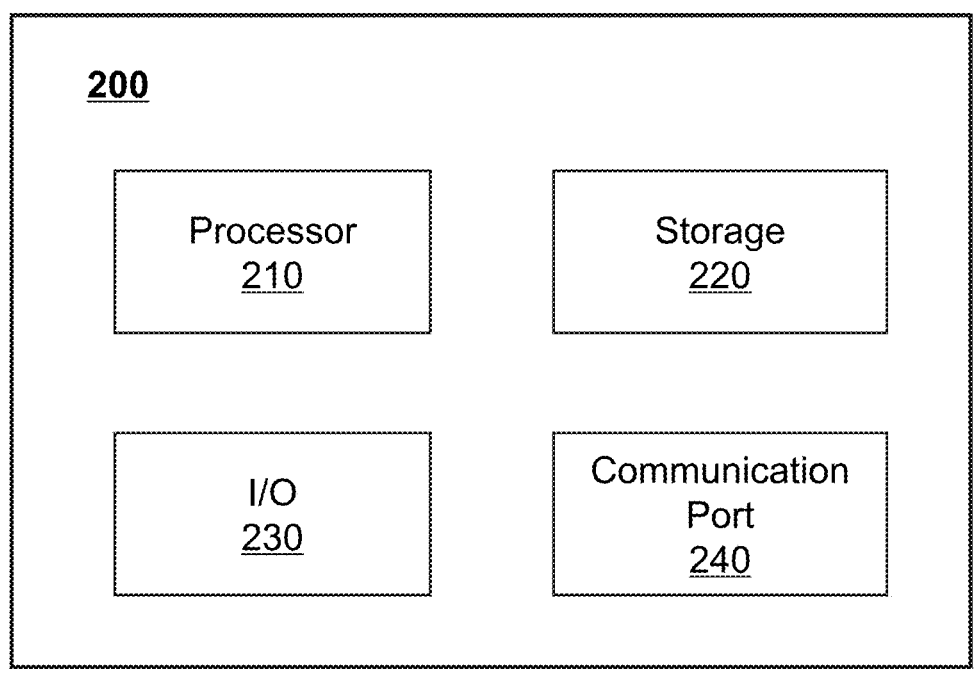
FIG. 2 is a schematic diagram illustrating hardware and/or software components of an exemplary computing device on which the processing device may be implemented according to some embodiments of the present disclosure.

FIG. 2 is a schematic diagram illustrating hardware and/or software components of an exemplary computing device 200 on which the processing device 120 may be implemented according to some embodiments of the present disclosure. As illustrated in FIG. 2, the computing device 200 may include a processor 210, a storage 220, an input/output (I/O) 230, and a communication port 240.

The processor 210 may execute computer instructions (program codes) and perform functions of the processing device 120 in accordance with techniques described herein. The computer instructions may include, for example, routines, programs, objects, components, signals, data structures, procedures, modules, and functions, which perform particular functions described herein. For example, the processor 210 may process data obtained from the medical device 110, the terminal(s) 140, the storage device 130, and/or any other component of the imaging system 100. Specifically, the processor 210 may process one or more measured data sets obtained from the medical device 110. For example, the processor 210 may generate an image based on the data set(s). In some embodiments, the generated image may be stored in the storage device 130, the storage 220, etc. In some embodiments, the generated image may be displayed on a display device by the I/O 230. In some embodiments, the processor 210 may perform instructions obtained from the terminal(s) 140. In some embodiments, the processor 210 may include one or more hardware processors, such as a microcontroller, a microprocessor, a reduced instruction set computer (RISC), an application-specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field-programmable gate array (FPGA), an advanced RISC machine (ARM), a programmable logic device (PLD), any circuit or processor capable of executing one or more functions, or the like, or any combinations thereof.

Merely for illustration, only one processor is described in the computing device 200. However, it should be noted that the computing device 200 in the present disclosure may also include multiple processors. Thus operations and/or method steps that are performed by one processor as described in the present disclosure may also be jointly or separately performed by the multiple processors. For example, if in the present disclosure the processor of the computing device 200 executes both operation A and operation B, it should be understood that operation A and operation B may also be performed by two or more different processors jointly or separately in the computing device 200 (e.g., a first processor executes operation A and a second processor executes operation B, or the first and second processors jointly execute operations A and B).

The storage 220 may store data/information obtained from the medical device 110, the terminal(s) 140, the storage device 130, or any other component of the imaging system 100. In some embodiments, the storage 220 may include a mass storage device, a removable storage device, a volatile read-and-write memory, a read-only memory (ROM), or the like, or any combination thereof. For example, the mass storage may include a magnetic disk, an optical disk, a solid-state drive, etc. The removable storage may include a flash drive, a floppy disk, an optical disk, a memory card, a zip disk, a magnetic tape, etc. The volatile read-and-write memory may include a random access memory (RAM). The RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, the storage 220 may store one or more programs and/or instructions to perform exemplary methods described in the present disclosure. For example, the storage 220 may store a program for the processing device 120 for generating attenuation correction data for a PET image.

The I/O 230 may input or output signals, data, and/or information. In some embodiments, the I/O 230 may enable user interaction with the processing device 120. In some embodiments, the I/O 230 may include an input device and an output device. Exemplary input devices may include a keyboard, a mouse, a touch screen, a microphone, or the like, or a combination thereof. Exemplary output devices may include a display device, a loudspeaker, a printer, a projector, or the like, or a combination thereof. Exemplary display devices may include a liquid crystal display (LCD), a light-emitting diode (LED)-based display, a flat panel display, a curved screen, a television device, a cathode ray tube (CRT), or the like, or a combination thereof.

The communication port 240 may be connected with a network (e.g., the network 150) to facilitate data communications. The communication port 240 may establish connections between the processing device 120 and the medical device 110, the terminal(s) 140, or the storage device 130. The connection may be a wired connection, a wireless connection, or a combination of both that enables data transmission and reception. The wired connection may include an electrical cable, an optical cable, a telephone wire, or the like, or any combination thereof. The wireless connection may include a Bluetooth™ network, a Wi-Fi network, a WiMax network, a WLAN, a ZigBee™ network, a mobile network (e.g., 3G, 4G, 5G, etc.), or the like, or any combination thereof. In some embodiments, the communication port 240 may be a standardized communication port, such as RS232™, RS485™, etc. In some embodiments, the communication port 240 may be a specially designed communication port. For example, the communication port 240 may be designed in accordance with the digital imaging and communications in medicine (DICOM) protocol.

Figure 3:
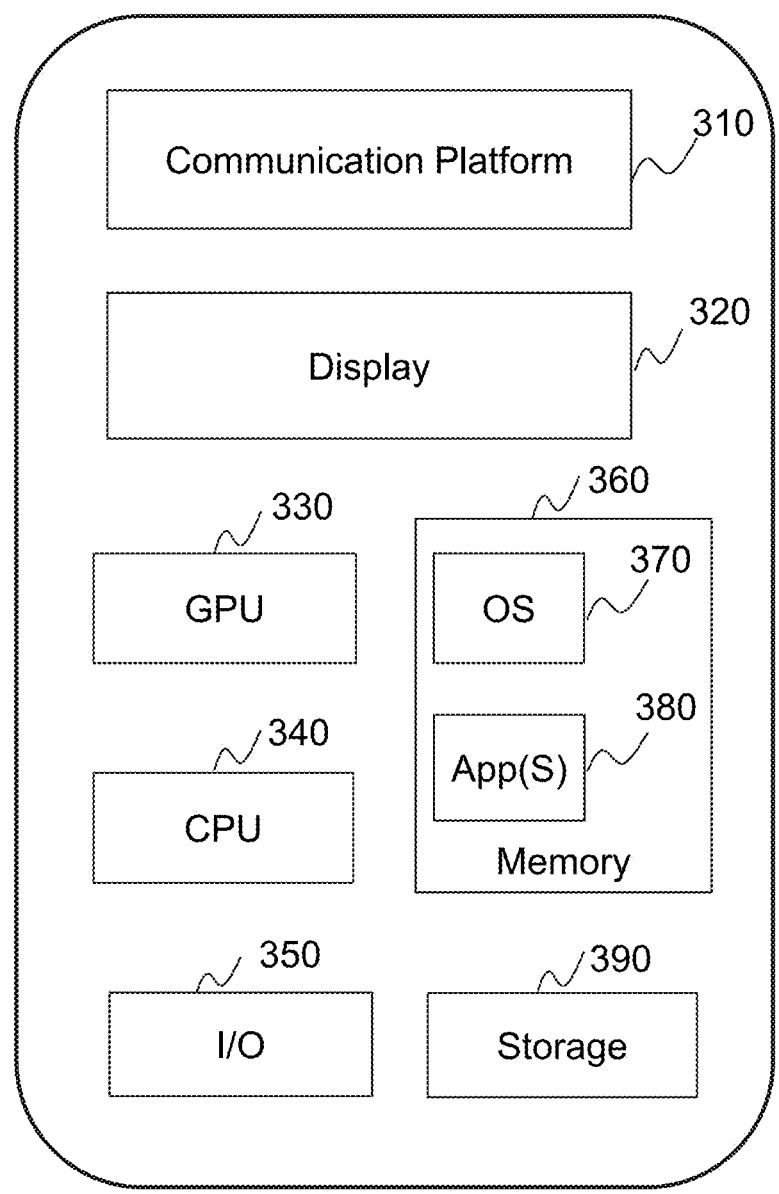
FIG. 3 is a schematic diagram illustrating hardware and/or software components of an exemplary mobile device according to some embodiments of the present disclosure.

FIG. 3 is a schematic diagram illustrating hardware and/or software components of an exemplary mobile device 300 according to some embodiments of the present disclosure. As illustrated in FIG. 3, the mobile device 300 may include a communication platform 310, a display 320, a graphics processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300. In some embodiments, a mobile operating system 370 (e.g., iOS™, Android™, Windows Phone™, etc.) and one or more applications 380 may be loaded into the memory 360 from the storage 390 in order to be executed by the CPU 340. The applications 380 may include a browser or any other suitable mobile apps for receiving and rendering information relating to image processing or other information from the processing device 120. User interactions with the information stream may be achieved via the I/O 350 and provided to the processing device 120 and/or other components of the imaging system 100 via the network 150.

To implement various modules, units, and functionalities described in the present disclosure, computer hardware platforms may be used as the hardware platform(s) for one or more of the elements described herein. The hardware elements, operating systems and programming languages of such computers are conventional in nature, and it is presumed that those skilled in the art are adequately familiar therewith to adapt those technologies to generate an image as described herein. A computer with user interface elements may be used to implement a personal computer (PC) or another type of work station or terminal device, although a computer may also act as a server if appropriately programmed. It is believed that those skilled in the art are familiar with the structure, programming and general operation of such computer equipment and as a result, the drawings should be self-explanatory.

Figure 4A:
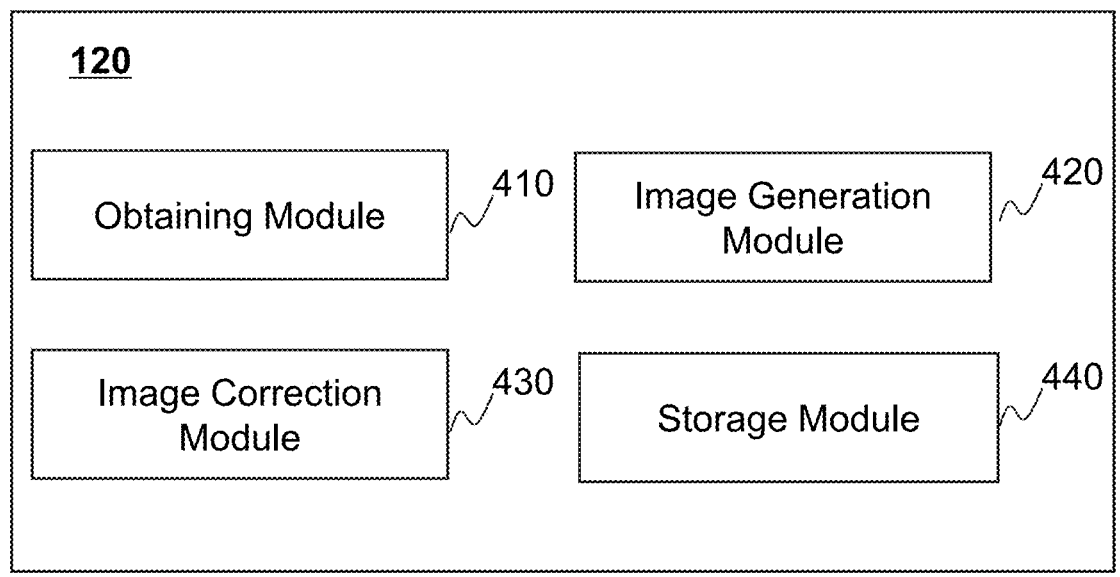
FIG. 4A is a block diagram illustrating an exemplary processing device for image generation and correction according to some embodiments of the present disclosure.

FIG. 4A is a block diagram illustrating an exemplary processing device according to some embodiments of the present disclosure. In some embodiments, processing device 120 may be implemented on a computing device 200 (e.g., the processor 210) illustrated in FIG. 2 or a CPU 340 as illustrated in FIG. 3. As illustrated in FIG. 4A, the processing device 120 may include an obtaining module 410, an image generation module 420, an image correction module 430, and a storage module 440. Each of the modules described above may be a hardware circuit that is designed to perform certain actions (e.g., according to a set of instructions stored in one or more storage media, and/or any combination of the hardware circuit and the one or more storage media).

The obtaining module 410 may be configured to obtain data and/or information for image correction. For example, the obtaining module 410 may obtain a first image acquired by an imaging device. The first image may include a representation of a blood vessel of a subject based on a tracer. As another example, the obtaining module 410 may obtain one or more fourth images associated with the blood vessel. The one or more fourth images and the first image may be generated by the imaging device via scanning the subject including the blood vessel in the same scan. The first image may be acquired earlier than a portion of the one or more fourth images (i.e., a time period in which the first image is acquired may be earlier than a portion of the multiple consecutive time periods in which the one or more fourth images are acquired). As still another example, the obtaining module 410 may obtain a blood vessel model. The blood vessel model may be configured to provide one or more constraints to one or more characteristics of the blood vessel. For example, the one or more constraints may include a first constraint that a size of the blood vessel exceeds a spatial resolution of the imaging device or an image resolution of the first image. As another example, the one or more constraints may include a second constraint that a cross-section of the blood vessel is approximately circular. As still another example, the one or more constraints may include a third constraint that the boundary of the cross-section of the blood vessel is continuous (i.e., the cross-section of the blood vessel is enclosed). As still another example, the one or more constraints may include a fourth constraint that a concentration of the tracer in the blood vessel is uniform. In some embodiments, the obtaining module 410 may obtain one or more models. For example, the obtaining module 410 may obtain a first trained machine learning model for image reconstruction and a second trained machine learning model for image correction.

The image generation module 420 may be configured to generate a second image based on the blood vessel model, the first image, and the resolution model (e.g., a point spread function) of the first image. The second image may include a representation of the blood vessel. An image resolution (or a second image resolution) of the second image may be higher than an image resolution (or a first image resolution) of the first image. The representation of the blood vessel in the second image may satisfy at least one of the one or more constraints.

In some embodiments, the image generation module 420 may determine the second image based on a resolution model associated with the imaging device via performing an iterative process. For example, for each iteration of the iterative process, the image generation module 420 may determine a third image having an image resolution higher than the first image resolution of the first image based on the resolution model of the imaging device as the first image satisfies the first constraint. The image generation module 420 may determine an estimated second image based on the third image and at least one of the second constraint, the third constraint, the fourth constraint, or the fifth constraint, such that the estimated second image satisfies the at least one of the second constraint, the third constraint, the fourth constraint, or the fifth constraint. The image generation module 420 may determine whether a termination condition (e.g., an iteration count of the iterative process) is satisfied. The image generation module 420 may update the first image using the estimated second image in response to a determination that the termination condition is unsatisfied. The updated first image (i.e., the estimated second image generated in a current iteration) may be processed by the image generation module 420 in the next iteration until the termination condition is satisfied. The image generation module 420 may designate the estimated second image as the second image in response to a determination that the termination condition is satisfied. In some embodiments, the image generation module 420 may determine the second image using a first trained machine learning model for image reconstruction. For example, the image generation module 420 may input the first image into the first trained machine learning model. The first trained machine learning model may generate and output the second image.

The image correction module 430 may be configured to perform a partial volume correction on each of the one or more fourth images to obtain one or more corrected fourth images or a plasma input function. In some embodiments, the image correction module 430 may obtain the one or more corrected fourth images or the plasma input function using the second trained machine learning model for image correction. For example, the image correction module 430 may input each of the one or more fourth images and the second image into the second trained machine learning model. For each input, one of the one or more fourth images and the second image may be inputted into the second trained machine learning model. The second trained machine learning model may process each of the one or more fourth images and the second image based on a second mapping relationship, and output the one or more corrected fourth images. As another example, one or more fourth images may be arranged as an image sequence. The image correction module 430 may input the image sequence and the second image into the second trained machine learning model. The second trained machine learning model may process each of the one or more fourth images and the second image based on the second mapping relationship and output the corrected image sequence or the plasma input function.

In some embodiments, the image correction module 430 may determine a plasma input function associated with the blood vessel based on the one or more corrected fourth images generated using the second trained machine learning model. The image correction module 430 may determine multiple corrected values of the concentration of the tracer in the blood vessel in different time periods based on the one or more corrected fourth images. Each of the multiple corrected values of the concentration of the tracer may be determined based on one of the one or more fourth images. The image correction module 430 may determine the plasma input function using a fitting technique based on the multiple corrected values of the concentration and time points corresponding to the corrected fourth images.

The storage module 440 may be configured to store data and/or instructions associated with the imaging system 100. For example, the storage module 440 may store data of the first image acquired by the imaging device, the blood vessel model, the second image generated based on the blood vessel model and the first image, the first trained machine learning model, the second trained machine learning model, etc. In some embodiments, the storage module 440 may be the same as the storage device 130 and/or the storage module 470 in configuration.

It should be noted that the above description is merely provided for the purposes of illustration, and not intended to limit the scope of the present disclosure. Apparently, for persons having ordinary skills in the art, multiple variations and modifications may be conducted under the teachings of the present disclosure. However, those variations and modifications do not depart from the scope of the present disclosure. For example, the image generation module 420 and the image correction module 430 may be integrated into a single module. As another example, some other components/modules may be added into the processing device 120.

Figure 4B:
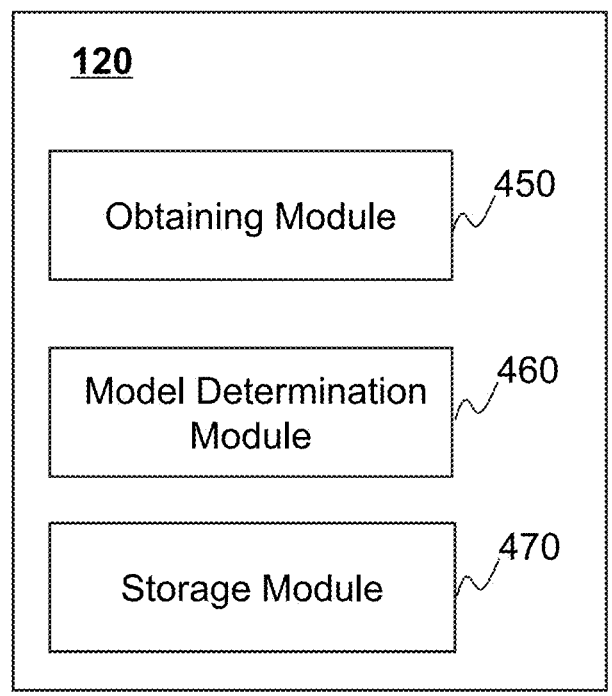
FIG. 4B is a block diagram illustrating an exemplary processing device for training a machine learning model according to some embodiments of the present disclosure.

FIG. 4B is a block diagram illustrating an exemplary processing device according to some embodiments of the present disclosure. In some embodiments, processing device 120 may be implemented on a computing device 200 (e.g., the processor 210) illustrated in FIG. 2 or a CPU 340 as illustrated in FIG. 3. As illustrated in FIG. 4B, the processing device 120 may include an obtaining module 450, a model determination module 460, and a storage module 470. Each of the modules described above may be a hardware circuit that is designed to perform certain actions, e.g., according to a set of instructions stored in one or more storage media, and/or any combination of the hardware circuit and the one or more storage media.

The obtaining module 450 may be configured to obtain multiple groups of training samples. Each group of the multiple groups of training samples may correspond to an object including a blood vessel (e.g., the carotid artery). Each group of the multiple groups of training samples may include one or more input images of a machine learning model and a desired output of the machine learning model in a process of training the machine learning model. For example, if the machine learning model is trained to obtain a first trained machine learning model, a first specific image of each group of first training samples may be served as an input image of the machine learning model, and a first reference image corresponding to the first specific image may be served as a desired output of the machine learning model. As another example, if the machine learning model is trained to obtain a second trained machine learning model, a second specific image of each group of second training samples and a particular image may be served as input images of the machine learning model, and a second reference image corresponding to the second specific image may be served as a desired output of the machine learning model.

The model determination module 460 may be configured to generate a trained machine learning model by training a machine learning model using the multiple groups of training samples in a training process. In some embodiments, the model determination module 460 may construct the trained machine learning model based on a convolutional neural network (CNN) model, a recurrent neural network (RNN) model, a long short term memory (LSTM) network model, a fully convolutional neural network (FCN) model, a generative adversarial network (GAN) model, a back propagation (BP) machine learning model, a radial basis function (RBF) machine learning model, a deep belief nets (DBN) machine learning model, an Elman machine learning model, or the like, or any combination thereof. The model determination module 460 may train the machine learning model based on the multiple groups of training samples using a training algorithm. In some embodiments, the model determination module 460 may perform a plurality of iterations to iteratively update one or more parameter values of the machine learning model to obtain the trained machine learning model. Before the plurality of iterations, the model determination module 460 may initialize the parameter values of the machine learning model.

The storage module 470 may be configured to store data and/or instructions associated with the imaging system 100. For example, the storage module 440 may store data of multiple groups of training samples (e.g., the first training sample and the second training samples), one or more machine learning models, the trained machine learning model, etc. In some embodiments, the storage module 470 may be the same as the storage device 130 and/or the storage module 440 in configuration.

It should be noted that the above description is merely provided for the purposes of illustration, and not intended to limit the scope of the present disclosure. Apparently, for persons having ordinary skills in the art, multiple variations and modifications may be conducted under the teachings of the present disclosure. However, those variations and modifications do not depart from the scope of the present disclosure. For example, the obtaining module 450 and the storage module 470 may be integrated into a single module. As another example, some other components/modules may be added into the processing device 120.

Figure 5:
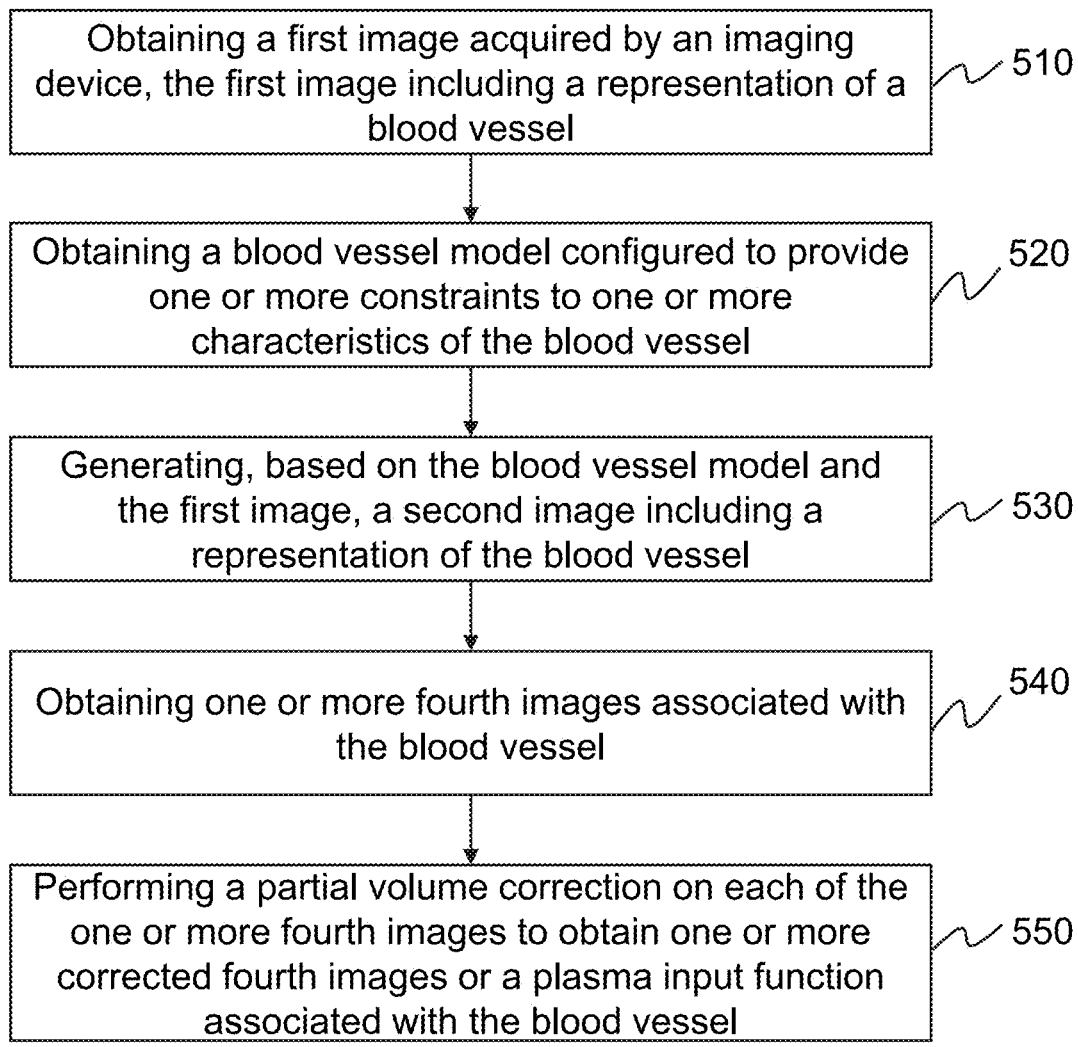
FIG. 5 is a schematic flowchart illustrating an exemplary process for determining a plasma input function according to some embodiments of the present disclosure.

FIG. 5 is a schematic flowchart illustrating an exemplary process for determining a plasma input function according to some embodiments of the present disclosure. In some embodiments, process 500 may be implemented as a set of instructions (e.g., an application) stored in the storage device 130, storage 220, or storage 390. The processing device 120, the processor 210 and/or the CPU 340 may execute the set of instructions, and when executing the instructions, the processing device 120, the processor 210 and/or the CPU 340 may be configured to perform the process 500. The operations of the illustrated process presented below are intended to be illustrative. In some embodiments, the process 500 may be accomplished with one or more additional operations not described and/or without one or more of the operations discussed. Additionally, the order of the operations of the process 500 illustrated in FIG. 5 and described below is not intended to be limiting.

In 520, the processing device 120 (e.g., the obtaining module 410) may obtain a blood vessel model. The blood vessel model may be configured to provide one or more constraints to one or more characteristics of the blood vessel.

In some embodiments, the one or more constraints may include a first constraint that the size of the blood vessel exceeds the spatial resolution of the imaging device or the first image resolution of the first image. The size of a specific blood vessel exceeding a spatial resolution of a specific imaging device or an image resolution of an image may refer to that the specific imaging device may recognize the specific blood vessel, i.e., a count of pixels representing the specific blood vessel in the image acquired by the specific imaging device may exceed 1. In some embodiments, the one or more constraints may include a second constraint that the cross-section of the blood vessel is approximately circular. In some embodiments, the one or more constraints may include a third constraint that the boundary of the cross-section of the blood vessel is continuous, i.e., the cross-section of the blood vessel is enclosed. In some embodiments, the one or more constraints may include a fourth constraint that the concentration of the tracer in the blood vessel is uniform. As used herein, "the uniform concentration of the tracer in the blood vessel" may indicate that the deviation of a maximum concentration and a minimum concentration of the tracer in different regions of the blood vessel at a specific time point does not exceed a threshold, e.g., 10%, or 5%, or 2%, or 1%, or 0.5% of one of the maximum concentration and the minimum concentration. In some embodiments, the blood vessel model may further include a fifth constraint including a hypothesis that a thickness of the wall of the blood vessel is close to 0. That is, the thickness of the wall of the blood vessel may be ignored. In some embodiments, the one or more constraints may include a sixth constraint that the size of the blood vessel is in a range, such as 5.5 millimeters to 7.7 millimeters, or 4.5 millimeters to 5.5 millimeters, or 5 millimeters to 6 millimeters, etc.

In some embodiments, after a specific image with a low image resolution (e.g., the first image) is processed or reconstructed to improve the image resolution of the specific image, the image resolution of the specific image may be improved, but the blood vessel represented in the reconstructed specific image may deviate from the actual blood vessel, i.e., at least a portion of the characteristics of the blood vessel represented in the processed specific image may be different from the actual characteristics of the blood vessel. For example, the shape of the cross section of the blood vessel represented in the reconstructed specific image may be triangular. As another example, the boundary of the cross section of the blood vessel represented in the reconstructed specific image may be discontinuous. However, if the representation of the blood vessel in the reconstructed image satisfies at least one of the one or more constraints (e.g., the second constraint and the third constraint), the blood vessel represented in the specific reconstructed image (e.g., the second image as illustrated in 530) may be deemed closer to or the same as the actual blood vessel. In other words, a reconstructed image (e.g., the second image as illustrated in 530) in which the representation of the blood vessel satisfies at least one of the one or more constraints (e.g., the second constraint and the third constraint) may be deemed closer to an ideal or desired image (also referred to as true image) of the blood vessel than the specific image and a reconstructed image in which the representation of the blood vessel does not satisfy at least one of the one or more constraints. The reconstructed image in which the representation of the blood vessel satisfies at least one of the one or more constraints may be also referred to as a right image of the blood vessel of the subject. The blood vessel model may be used to improve a probability that an image is similar to or the same as a true representation of the blood vessel. As used herein, an image being deemed "close to," "similar to," or "the same as" another image may indicate that the similarity degree between the two images exceeds a threshold, e.g., 99%, 90%, 80%, etc.

In 530, the processing device 120 (e.g., the image generation module 420) may generate a second image based on the blood vessel model and the first image. The second image may include a representation of the blood vessel. An image resolution (or a second image resolution) of the second image may be higher than the first image resolution of the first image. The boundary of the blood vessel represented in the second image may be sharper than the boundary of the blood vessel represented in the first image. In some embodiments, the count (or number) of a plurality of second pixels in the second image may be greater than the count (or number) of the plurality of first pixels in the first image. As used herein, the first image may be also referred to as a low-image resolution image of the blood vessel. The second image may be also referred to as a high-image resolution image of the blood vessel. The representation of the blood vessel in the second image may satisfy at least one of the one or more constraints.

In some embodiments, the processing device 120 may determine the second image based on the resolution model associated with the imaging device via performing an iterative process. The second image may be converted into the first image using the resolution model. For example, the first image may be obtained by performing a convolution operation on the second image. Specifically, for each iteration of the iterative process, the processing device 120 may determine a third image having an image resolution higher than the first image resolution of the first image (or the preprocessed first image) based on the resolution model of the imaging device as the first image satisfies the first constraint. The processing device 120 may determine an estimated second image based on the third image and at least one of the second constraint, the third constraint, the fourth constraint, or fifth constraint, such that the estimated second image satisfies the at least one of the second constraint, the third constraint, the fourth constraint, or the fifth constraint. The processing device 120 may determine whether a termination condition (e.g., an iteration count of the iterative process) is satisfied. The processing device 120 may update the first image using the estimated second image in response to a determination that the termination condition is unsatisfied. The updated first image (i.e., the estimated second image generated in a current iteration) may be processed by the processing device in the next iteration until the termination condition is satisfied. The processing device 120 may designate the estimated second image as the second image in response to a determination that the termination condition is satisfied. More descriptions for determining the second image based on the iterative process may be found in FIG. 6 and the descriptions thereof.

In some embodiments, the processing device 120 may determine the second image using a trained machine learning model (also referred to as a first trained machine learning model). For example, the processing device 120 may input the first image into the trained machine learning model. The first trained machine learning model may generate and output the second image. In some embodiments, the processing device 120 may retrieve the first trained machine learning model from the storage device 130, the terminals(s) 140, or any other storage device. For example, the first trained machine learning model may be determined by training a machine learning model offline using the processing device 120 or a processing device other than the processing device 120. The first trained machine learning model may be stored in the storage device 130, the terminals(s) 140, or any other storage device. The processing device 120 may retrieve the first trained machine learning model from the storage device 130, the terminals(s) 140, or any other storage device in response to receipt of a request for image reconstruction.

The first trained machine learning model may be configured to convert a low-image resolution image (e.g., the first image) into a high-image resolution image (e.g., the second image). In some embodiments, the trained machine learning model may be configured to provide a first mapping relationship between the low-image resolution image (e.g., the first image) and the high-image resolution image (e.g., the second image). The trained machine learning model may be configured to generate the high-image resolution image (e.g., the second image) according to the first mapping relationship. The first mapping relationship between the low-image resolution image (e.g., the first image) and the high-image resolution image (e.g., the second image) or the first trained machine learning model may be generated in a first training process of the first trained learning model using multiple groups of first training samples. Each group of the multiple groups of first training samples may include a low-image resolution image (also referred to as a first specific image) and a high-image resolution image (also referred to as a first reference image) of a blood vessel. The low-image resolution image may be determined based on the blood vessel model and the high-image resolution image. More descriptions for the multiple groups of first training samples may be found in FIG. 7. The first training process of the first trained machine learning model may be performed according to process 700.

In some embodiments, the processing device 120 may preprocess the first image using a preprocessing operation. The first image after being preprocessed may be referred to as a preprocessed first image. Exemplary preprocessing operations may include a denoising operation using a Gaussian filter, a median filter, a mean filter, a Laplacian filter, an anisotropic filter, a non-local means filter, a cosine filter, or the like, or any combination thereof. The processing device 120 may determine the second image based on the preprocessed first image.

In 540, the processing device 120 (e.g., the image generation module 420) may obtain one or more fourth images associated with the blood vessel. The one or more fourth images and the first image may be generated by the imaging device via scanning the subject in the same scan. For example, the one or more fourth images may be determined from the plurality of images acquired by the imaging device via scanning the subject including the blood vessel in the multiple consecutive time periods after the tracer is injected into the subject as described in operation 510. In some embodiments, the one or more fourth images may include the first image. The first image may be acquired earlier than a portion of the one or more fourth images, i.e., a time period in which the first image is acquired may be earlier than a portion of the multiple consecutive time periods in which the one or more fourth images are acquired. For example, the first image may be acquired in the early time period of 1_minute to 2 minutes after the injection of the tracer, and all of the one or more fourth images may be acquired in time periods after the 1 minute to 2_minute early time period after the injection of the tracer, such as 2 minutes to 3 minutes, 3 minutes to 5 minutes, 5 minutes to 7 minutes, 7 minutes to 15 minutes, 15 minutes to 35 minutes, 35 minutes to 60 minutes, etc., after the injection of the tracer. As another example, the first image may be acquired in a time period of 1 minute to 2 minutes after the injection of the tracer, and one of the one or more fourth images may be acquired in a time period of 0.5 minutes to 1 minute after the injection of the tracer and the remaining fourth images may be acquired in time periods after the 1 minute to 2 minute early time period after the injection of the tracer, such as 2 minutes to 3 minutes, 3 minutes to 5 minutes, 5 minutes to 7 minutes, 7 minutes to 15 minutes, 15 minutes to 35 minutes, 35 minutes to 60 minutes, etc., after the injection of the tracer.

In 550, the processing device 120 (e.g., the image generation module 420) may perform a partial volume correction on each of the one or more fourth images to obtain one or more corrected fourth images or a plasma input function. Each of the one or more corrected fourth images may include a plurality of fourth pixels or voxels each of which may represent a concentration (e.g., SUV) of the tracer in a portion of the subject.

In some embodiments, the processing device 120 may perform the partial volume correction on each of the one or more fourth images based on the second image using a second trained machine learning model for image correction. The second trained machine learning model may be configured to provide a second mapping relationship between a fourth image, the second image, and a corrected fourth image. The processing device 120 may obtain the one or more corrected fourth images based on the second mapping relationship or the plasma input function based on the one or more corrected fourth images. For example, the processing device 120 may input each of the one or more fourth images and the second image into the second trained machine learning model. For each input, one of the one or more fourth images and the second image may be inputted into the second trained machine learning model. The second trained machine learning model may process each of the one or more fourth images and the second image based on the second mapping relationship, and output the one or more corrected fourth images. As another example, the one or more fourth images may be arranged as an image sequence. The processing device 120 may input the image sequence and the second image into the second trained machine learning model. The second trained machine learning model may process each of the one or more fourth images and the second image based on the second mapping relationship and output the corrected image sequence or the plasma input function. In some embodiments, the processing device 120 may retrieve the second trained machine learning model from the storage device 130, the terminals(s) 140, or any other storage device. For example, the second trained machine learning model may be determined by training a machine learning model offline using the processing device 120 or a processing device other than the processing device 120. The second trained machine learning model may be stored in the storage device 130, the terminals(s) 140, or any other storage device. The processing device 120 may retrieve the second trained machine learning model from the storage device 130, the terminals(s) 140, or any other storage device in response to receipt of a request for image correction. The second machine learning model may be generated based on multiple groups of second training samples in a second training process of the second trained machine learning model. The second training process of the second trained machine learning model may be performed according to process 700. More descriptions for the multiple groups of second training samples may be found in FIG. 7. The first trained machine learning model and the second trained machine learning model may be constructed based on machine learnings with the same type or different types.

In some embodiments, the processing device 120 (e.g., the image correction module 430) may determine a plasma input function (also referred to as an image-derived input function, IDIF) associated with the blood vessel based on the one or more corrected fourth images generated using the second trained machine learning model. The plasma input function may be also referred to as a plasma time activity curve (TAC). The plasma input function associated with the blood vessel may describe the change of the concentration of radioactivity of the tracer (i.e., radioactivity activity or concentration) in the plasma with time. For generating the plasma input function, the processing device 120 may determine multiple corrected values of the concentration of the tracer in the blood vessel in different time periods based on the one or more corrected fourth images. Each of the multiple corrected values of the concentration of the tracer may be determined based on one of the one or more fourth images. For example, the processing device 120 may determine a corrected value of the concentration in the blood vessel by averaging pixels values of pixels representing the blood vessel in a corrected fourth image. As another example, the processing device 120 may determine a corrected value of the concentration in the blood vessel based on a pixel value of a pixel in a center of the blood vessel represented in a corrected fourth image. For generating the plasma input function, the processing device 120 may also determine a time point corresponding to each of the one or more fourth images. For example, the processing device 120 may designate the starting time point, the ending time point, or an intermediate time point in a time period corresponding to a fourth image as the time point. The processing device 120 may determine the plasma input function using a fitting technique based on the multiple corrected values of the concentration and time points corresponding to the corrected fourth images. Exemplary fitting techniques may include using a line regression model, a gradient boost decision tree (GBDT) model, a support vector machine (SVM) model, a naive Bayesian model, an extreme gradient boosting (XG-BOOST) model, a causal model, or the like, or any combination thereof.

In some embodiments, the processing device 120 may determine the plasma input function based on the one or more fourth images, the second image, and one or more correction coefficients for partial volume correction. The one or more correction coefficients for partial volume correction may be determined based at least in part on the second image. In some embodiments, the processing device 120 may determine a corrected value of the concentration of the tracer in the blood vessel corresponding to each of the one or more fourth images based on Equation (1) as follows:

$$M = \alpha A + \beta B, \quad (1)$$

where M refers to a value (also referred to detected value) of the concentration of the tracer in the blood vessel derived from each of the one or more fourth images; A refers to a corresponding corrected value (also referred to actual value) of the concentration of the tracer in the blood vessel; B refers to an actual value of the concentration of the tracer in a surrounding tissue (or region) of the blood vessel; α and β refer to correction coefficients including a spill-out coefficient and a spill-in coefficient, respectively. As used herein, the spill-out coefficient may relate to a spill-out effect describing an impact of the concentration of the tracer in the blood vessel on the concentration of tracer in the surrounding tissue or region. The spill-in coefficient may relate to a spill-in effect describing an impact of the concentration of the tracer in the surrounding tissue on the concentration of tracer in the blood vessel. The spill-out coefficient α and the spill-in coefficient may be determined based on the second image and the PSF model associated with the imaging device according to Equations (2) and (3) as follows:

$$\alpha = \sum_i I(i) * J(i) \Big/ \sum_i I(i), \quad (2)$$

$$\beta = \frac{\sum_i I(i) * (1 - J(i))}{\sum_i I(i)}, \quad (3)$$

where I refers to the second image; J refers to an estimated image with an image resolution lower than the second mage; and i refers to an index of a pixel in the second image and/or the estimated image. The second image I may a binary image. Pixel values of pixels representing the blood vessel in the second image I may be set to be 1 and pixel values of pixels representing the remaining portion of the second image I may be set to be 0. The estimated image J may be obtained by performing a convolution operation on the second image based on the PSF model associated with the imaging device. In some embodiments, the estimated image may be the first image. The actual value B of the concentration the tracer in the surrounding tissue (or region) of the blood vessel may be similar to or the same as the detected value of the concentration the tracer in the surrounding tissue (or region) of the blood vessel. The detected value of the concentration the tracer in the surrounding tissue (or region) of the blood vessel may be determined based on each of the one or more fourth images and designate the detected value of the concentration of the tracer in the surrounding tissue (or region) of the blood vessel as the actual value of the concentration B. The processing device 120 may determine the detected value M of the concentration of the tracer in the blood vessel based on each of the one or more fourth images. Then according to Equation (1), the processing device 120 may determine the actual value A of the concentration of the tracer in the blood vessel based on the detected value M, the actual value B, and the correction coefficients α and β. The processing device 120 may determine the plasma input function based on the actual value A of the concentration the tracer in the blood vessel for each of the one or more fourth images.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more operations may be omitted and/or one or more additional operations may be added. For example, operation 510 and operation 520 may be combined into a single operation. As another example, one or more other optional operations (e.g., a storing operation) may be added elsewhere in the process 500. In the storing operation, the processing device 120 may store information and/or data (e.g., the first image, the second image, the blood vessel model, the trained machine learning model, etc.) associated with the imaging system 100 in a storage device (e.g., the storage device 130) disclosed elsewhere in the present disclosure.

Figure 6:
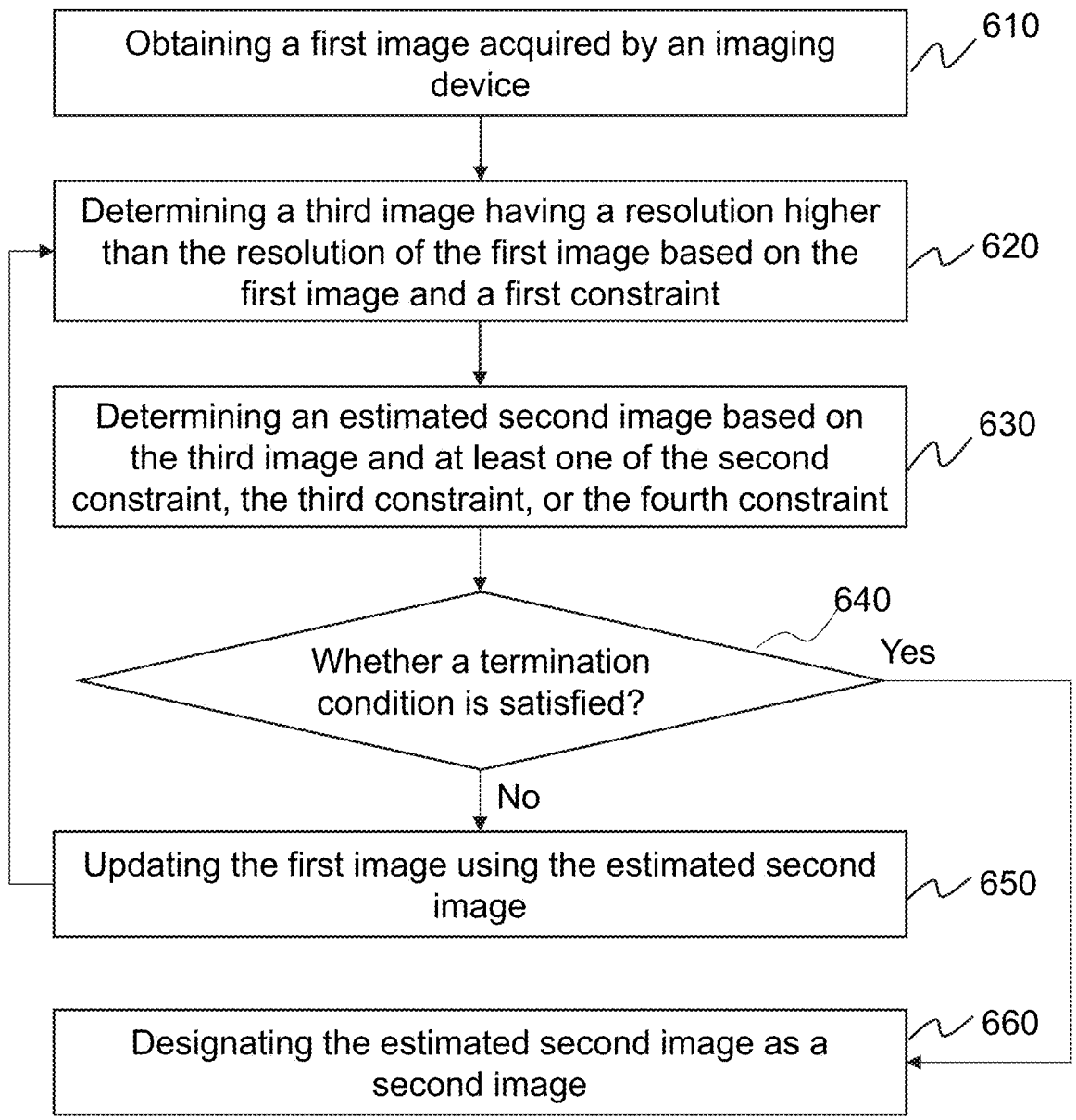
FIG. 6 is a schematic flowchart illustrating an exemplary process for determining a second image based on an iterative process according to some embodiments of the present disclosure.

FIG. 6 is a schematic flowchart illustrating an exemplary process for determining a second image based on an iterative process according to some embodiments of the present disclosure. In some embodiments, process 600 may be implemented as a set of instructions (e.g., an application) stored in the storage device 130, storage 220, or storage 390. The processing device 120, the processor 210 and/or the CPU 340 may execute the set of instructions, and when executing the instructions, the processing device 120, the processor 210 and/or the CPU 340 may be configured to perform the process 600. The operations of the illustrated process presented below are intended to be illustrative. In some embodiments, the process 600 may be accomplished with one or more additional operations not described and/or without one or more of the operations discussed. Additionally, the order of the operations of process 600 illustrated in FIG. 6 and described below is not intended to be limiting. In some embodiments, the second image described in connection with operation 530 in FIG. 5 may be obtained according to the process 600.

In 610, the processing device 120 (e.g., the obtaining module 410) may obtain a first image acquired by an imaging device. The imaging device may include a PET device, a SPECT device, a PET-CT device, etc., as described elsewhere in the present disclosure (e.g., FIGS. 1 and 5 and the descriptions thereof). The first image may include a representation of a subject including a blood vessel using a plurality of first pixels or voxels. Merely by way of example, the blood vessel may include a carotid artery with a plurality of characteristics, such as a size (i.e., a size of a cross-section of the blood vessel), a shape of the cross-section, a boundary of the cross-section, etc. More descriptions regarding the blood vessel and/or the first image may be found in FIG. 5 and the descriptions thereof.

In 620, the processing device 120 (e.g., the image generation module 420) may determine a third image based on the first image and a first constraint. The third image may include a representation of the blood vessel. An image resolution (or third image resolution) of the third image may be higher than an image resolution (or first image resolution) of the first image. The first constraint may include that the size of the blood vessel exceeds the image resolution of the first image. The representation of the blood vessel in the third image may satisfy the first constraint, such that the third image may be determined based on the first image. In other words, the size of the blood vessel may exceed the image resolution of the third image when the size of the blood vessel exceeds the first image resolution of the first image. The first image may be processed to obtain the third image with a higher image resolution than the first image.

The first image resolution of the first image may be defined by a resolution model, such as a PSF. In some embodiments, the processing device 120 may perform a deconvolution operation on the first image to obtain the third image based on the resolution model (e.g., PSF) associated with the spatial resolution of the imaging device. In some embodiments, the deconvolution operation may be performed to determine a solution (i.e., the third image) of a convolution equation constructed based on the PSF and the first image. The third image may be the solution of the convolution equation determined using a Weiner filter, a constrained least square (CLS) filter, a total variation (TV), a bilateral total variation (BTV), etc. In some embodiments, as the first image with low image resolution (i.e., the first image resolution) may lose some information associated with the blood vessel, the solution (i.e., the third image) of the convolution equation constructed based on the PSF and the first image may be not unique and the third image may be not a true solution of the convolution equation. And the third image may include noise, an artifact (e.g., a Gibbs artifact), etc. Iterative process 600 may be performed to cause the solution of the convolution equation constructed based on the PSF to approach (e.g., to be close to or the same as) the true solution. More descriptions about the artifact may be found elsewhere in the present disclosure (e.g., FIG. 12 and the descriptions thereof).

In some embodiments, before performing the deconvolution operation on the first image, the processing device 120 may preprocess the first image using a preprocessing operation. In some embodiments, the preprocessing operation may include using a Gaussian filter, a median filter, a mean filter, a Laplacian filter, an anisotropic filter, a non-local means filter, a cosine filter, or the like, or any combination thereof.

In 630, the processing device 120 (e.g., the image generation module 420) may determine an estimated second image based on the third image and at least one of a second constraint, a third constraint, a fourth constraint, or a fifth constraint. The second constraint may include that the cross-section of the blood vessel is approximately circular. The third constraint may include that the boundary of the cross-section of the blood vessel is continuous. The fourth constraint may include that the concentration of the tracer in the blood vessel is uniform. The fifth constraint may include a hypothesis that a thickness of the wall of the blood vessel is close to 0. That is, the thickness of the wall of the blood vessel may be ignored. In some embodiments, the first constraint, the second constraint, the third constraint, the fourth constraint, and the fifth constraint may be stored as a blood vessel model. The representation of the blood vessel in the estimated second image may satisfy at least one of the second constraint, the third constraint, the fourth constraint, or fifth constraint. As used herein, a representation of the blood vessel in an image satisfying a constraint may indicate that characteristics of the blood vessel represented in the image may approach (e.g., to be the same as or similar to) the characteristics of the blood vessel defined by the constraint. For example, the representation of the blood vessel in the estimated second image satisfying the second constraint may indicate that the shape of the blood vessel represented in the estimated second image is approximately circular. As another example, the representation of the blood vessel in the estimated second image satisfying the third constraint may indicate that the boundary of the blood vessel represented in the estimated second image may be substantially continuous. As still another example, the representation of the blood vessel in the estimated second image satisfying the fourth constraint and the fifth constraint may indicate that the pixel values of pixels representing the blood vessel in the estimated second image are substantially the same as the concentration of the tracer in the blood vessel which is deemed uniform and the thickness of the wall of the blood vessel is ignored.

In some embodiments, the processing device 120 may determine the estimated second image by performing a smoothing operation on a specific region of the third image. Before performing the smothering operation, the processing device 120 may determine the specific region in the third image. The specific region may include a representation of the blood vessel. The specific region may include a continuous boundary. The specific region may include a plurality of third pixels whose pixel values exceed a pixel value threshold and a plurality of third pixels whose pixel values are smaller than the pixel value threshold, for example, equal to 0. The processing device 120 may perform the smoothing operation on the plurality of pixels whose pixel values exceed the pixel value threshold in the specific region. The pixel value threshold may be set by a user or according to a default setting of the imaging system 100 or may be adjustable under different situations. In some embodiments, the pixel value threshold may be equal to a half of a maximum pixel value among third pixels in the specific region. In some embodiments, the specific region in the third image may include a first section associated with an edge region of the blood vessel and a second section associated with a central region of the blood vessel. The first section in the third image may be blurred. The smoothing operation may cause pixel values of third pixels representing the edge region of blood vessel in the estimated second image close to or same as pixel values of pixels representing the center region of the blood vessel, which may cause the blood vessel represented in the estimated second image to satisfy at least one of the first constraint, the second constraint, the third constraint, the fourth constraint, or the fifth constraint. In some embodiments, the smoothing operation may include median smoothing, Gaussian smoothing, average smoothing, normalized smoothing, bilateral filtering smoothing, or the like, or any combination thereof.

In some embodiments, the processing device 120 may determine the estimated second image by performing a denoising operation on the third image based on a compressed sensing technique. The denoising operation using the compressed sensing technique may be performed to determine the estimated second image satisfying at least one of the second constraint, the third constraint, the fourth constraint, or the fifth constraint. Using the compressed sense technique, a sparse transform (e.g., a discrete cosine transform, a wavelet transform, etc.) may be performed on the third image to obtain an image sparse representation. The image sparse representation may include less noise than the third image. The estimated second image may be recovered from the image sparse representation using an optimal algorithm, such as a k-SVD algorithm, a sparsity adaptive matching pursuit (SAMP) algorithm, a partial differential equation (e.g., a total variation algorithm), etc. In some embodiments, the blood vessel represented in the third image may include a first section associated with an edge region of the blood vessel and a second section associated with the center region of the blood vessel. The first section in the third image may include multiple third pixels whose pixel values are non-zero, which may cause the first section in the third image blurry. As the representation of the blood vessel in a real or desired image of the blood vessel satisfies at least one of the second constraint, the third constraint, the fourth constraint, or the fifth constraint, the third image may be expressed sparsely to decrease or remove noise in the third image. And the estimated second image may be recovered from the image sparse representation of the third image in a transform domain (e.g., a frequency domain, a wavelet domain, etc.), which may result in that pixel values of third pixels in the first section and the second section of the estimated second image are substantially equal or close to 0.

In 640, the processing device 120 (e.g., the image generation module 420) may determine whether a termination condition is satisfied. In response to a determination that the termination condition is satisfied, the processing device 120 may proceed to perform operation 660. In response to a determination that the termination condition is unsatisfied, the processing device 120 may proceed to perform operation 650. In operation 650, the processing device 120 may update the first image using the estimated second image. The updated first image (i.e., the estimated second image generated in a current iteration) may be processed by the processing device 120 in a next iteration. The processing device 120 may repeatedly perform operation 620 and 640 until the termination condition is satisfied.

In some embodiments, the termination condition may relate to a cost function. The cost function may be configured to compare and/or assess a difference between the first image and an estimated first image corresponding to the estimated second image. The estimated first image may have a lower image resolution than the estimated second image. The estimated first image may be generated based on the estimated second image and the spatial resolution of the imaging device. The estimated first image may be determined by performing a convolution operation on the estimated second image based on the resolution model (e.g., the PSF) associated with the imaging device. The termination condition may include that the value of the cost function is less than a threshold. In some embodiments, the termination condition may be satisfied that the value of the cost function is less than a threshold. If the value of the cost function exceeds the threshold in a current iteration, the processing device 120 may proceed to perform operation 650 to update the first image using the estimated second image generated in the current iteration. In some embodiments, the termination condition may be satisfied if the value of the cost function is minimal or smaller than a threshold (e.g., a constant). In some embodiments, the termination condition may be satisfied if the value of the cost function converges. The convergence may be deemed to have occurred if the variation of the values of the cost function in two or more consecutive iterations is smaller than a threshold (e.g., a constant). In some embodiments, the termination condition may relate to an iteration count (or number) of the iterative process, etc. For example, the termination condition may be satisfied when a specified number (or count) of iterations are performed in the iterative process.

In 650, the processing device 120 (e.g., the image generation module 420) may designate the estimated second image as a second image. An image resolution of the second image may be higher than the first image resolution of the first image. The characteristics (e.g., the structural information) of the blood vessel represented in the second image may be closer to the characteristics of the blood vessel in reality (i.e., the characteristics of the blood vessel represented in a desired or real image of the blood vessel) than the characteristics of the blood vessel presented in the first image. More descriptions of the second image may be found in FIG. 5 and the descriptions thereof.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more operations may be omitted and/or one or more additional operations may be added. For example, operation 620 and operation 630 may be combined into a single operation. As another example, one or more other optional operations (e.g., a storing operation) may be added elsewhere in the process 600. In the storing operation, the processing device 120 may store information and/or data (e.g., the third image, the fourth image, the reference image, etc.) associated with the imaging system 100 in a storage device (e.g., the storage device 130) disclosed elsewhere in the present disclosure.

Figure 7:
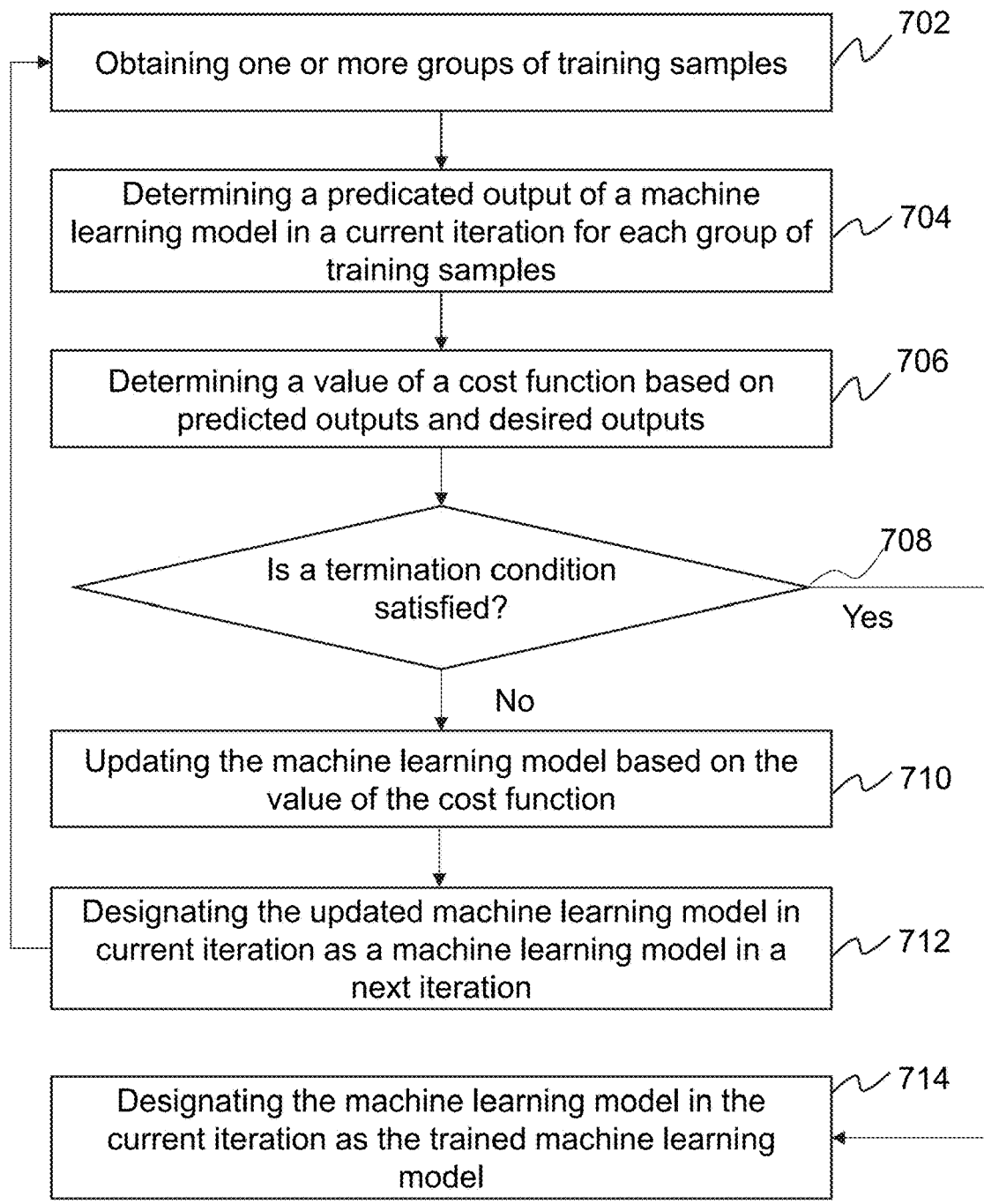
FIG. 7 is a schematic flowchart illustrating an exemplary training process of a trained machine learning model according to some embodiments of the present disclosure.

FIG. 7 is a schematic flowchart illustrating an exemplary training process of a trained machine learning model according to some embodiments of the present disclosure. In some embodiments, process 700 may be implemented as a set of instructions (e.g., an application) stored in the storage device 130, storage 220, or storage 390. The processing device 120, the processor 210 and/or the CPU 340 may execute the set of instructions, and when executing the instructions, the processing device 120, the processor 210 and/or the CPU 340 may be configured to perform the process 700. The operations of the illustrated process presented below are intended to be illustrative. In some embodiments, the process 700 may be accomplished with one or more additional operations not described and/or without one or more of the operations discussed. Additionally, the order of the operations of process 700 illustrated in FIG. 7 and described below is not intended to be limiting. In some embodiments, the first training process of the first trained machine learning model and/or the second training process of the second trained machine learning model as described in connection with operations 530 and 550, respectively, in FIG. 5 may be performed according to the process 700.

The trained machine learning model may be generated by training a machine learning model. In some embodiments, the machine learning model to be trained may include a convolutional neural network (CNN) model, a recurrent neural network (RNN) model, a long short term memory (LSTM) network model, a fully convolutional neural network (FCN) model, a generative adversarial network (GAN) model, a back propagation (BP) machine learning model, a radial basis function (RBF) machine learning model, a deep belief nets (DBN) machine learning model, an Elman machine learning model, or the like, or any combination thereof. The machine learning model may include a plurality of parameters, such as architecture parameters, learning parameters, etc. Exemplary architecture parameters of the machine learning model may include the size of a kernel of a layer, the total count (or number) of layers, the count (or number) of nodes in each layer, a learning rate, a batch size, an epoch, etc. Exemplary learning parameters may include a connected weight between two connected nodes, a bias vector relating to a node, etc.). Before the training, the machine learning model may have one or more initial parameter values. In the training of the machine learning model, learning parameters of the machine learning model may be updated. The updating of the learning parameters of the machine learning model may be also referred to as the updating the machine learning model. In some embodiments, the training process of the machine learning model may be an iterative including one or more iterations. For illustration purposes, a current iteration of the iteration(s) is described in the following description. The current iteration may include one or more operations of the process 700.

In 702, the processing device 120 (e.g., the obtaining module 450) may obtain multiple groups of training samples. Each group of the multiple groups of training samples may correspond to an object including a blood vessel (e.g., the carotid artery). In some embodiments, the object corresponding to one or more of the multiple groups of training samples may be a subject as described elsewhere in the present disclosure (e.g., FIGS. 1 and 5, and the descriptions thereof). Each group of the multiple groups of training samples may include one or more input images of a machine learning model and a desired output of the machine learning model in the process of training the machine learning model. The desired output of the machine learning model may be also referred to as a training label.

In some embodiments, if the machine learning model is trained to obtain the first trained machine learning model for image reconstruction as described in operation 530, the multiple groups of training samples may be also referred to as the multiple groups of first training samples as described in FIG. 5. Each group of first training samples may include a first specific image (also referred to as a low image resolution image) and a first reference image (also referred to as a high image resolution image) corresponding to the first specific image of a blood vessel. An image resolution of the first reference image may be higher than an image resolution of the first specific image. In the training process, the first specific image in each group of first training samples may serve as the input image of the machine learning model and the first reference image may serve as a desired output of the machine learning model, i.e., the training label. The first reference image (e.g., the second image as described in FIG. 6) may be generated or simulated based on a blood vessel model. The first reference image generated or simulated based on the blood vessel model may satisfy at least one of the first constraint, the second constraint, the third constraint, the fourth constraint, and the fifth constraint. In some embodiments, the first reference image may be generated by processing the first specific image based on the blood vessel model according to process 600 as described in FIG. 6. The acquisition of the first specific image may be similar to or same as the acquisition of the first image as described in operation 540 as illustrated in FIG. 5. For example, the first specific image may be acquired by a first imaging device (e.g., a PET device) via scanning a first object including a blood vessel in an early time period after the injection of a tracer. The first reference image may be generated by performing an iterative process on the first specific image according to process 600. In some embodiments, the first reference image may be determined by simulation based on the blood vessel model using a simulation technique (e.g., a Monte-Carlo technique). The blood vessel represented in the first reference image may satisfy at least one of the first constraint, the second constraint, the third constraint, and the fourth constraint. The first specific image may be generated by performing a convolution operation on the reference image based on a resolution model (e.g., the PSF) associated with a spatial resolution of an imaging device. The spatial resolution of the imaging device may be same as the spatial resolution defined by the first constraint of the blood vessel model.

In some embodiments, if the machine learning model is trained to obtain the second trained machine learning model for image correction as described in operation 550, the multiple groups of training samples may be also referred to as the multiple groups of second training samples as described in FIG. 5. In some embodiments, each group of second training samples may include a second specific image (also referred to as a low image resolution image), a second reference image (also referred to as a corrected second specific image) corresponding to the second specific image, and a particular image (also referred to as a high image resolution image). An image resolution of the second reference image and an image resolution of the particular image may be higher than an image resolution of the second specific image. In the training process, the second specific image and the particular image in each group of second training samples may serve as the input images of the machine learning model, while the second reference image may serve as the desired output of the machine learning model, i.e., the training label. The acquisition of the second specific image may be similar to or the same as the acquisition of the one or more fourth images as described in operation 540 as illustrated in FIG. 5. For example, the second specific image may be acquired by a second imaging device (e.g., a PET device) via scanning a second object including a blood vessel in a time period after the injection of a tracer. The generation of the particular image may be similar to or the same as the generation of the second image as described in connection with operation 530 as illustrated in FIG. 5 or according to process 600 as described in FIG. 6. For example, the particular image may be generated by processing an original image based on a blood vessel model associated with the second imaging device. The acquisition of the original image may be similar to or the same as the acquisition of the first image as described in operation 510 as illustrated in FIG. 5. Further, the particular image may be generated by processing the original image using the first trained machine learning model or according to the iterative process 600 as described in FIG. 6. The second reference image may be generated by performing a partial volume correction on the second specific image based on the particular fewer. The generation of the second reference image may be similar to or the same as the generation of the one or more corrected fourth images as described in operation 550 as illustrated in FIG. 5. For example, the second reference image may be generated by performing a partial volume correction on the second specific image according to Equations (1)-(3).

In some embodiments, each group of second training samples may include an image sequence including multiple image frames, a reference image sequence corresponding to the image sequence, and a particular image. In the training process, the image sequence and the particular image in each group of second training samples may serve as the input images of the machine learning model and the reference image sequence may serve as the desired output of the machine learning model, i.e., the training label. The acquisition of image sequence including multiple image frames may be similar to or the same as the acquisition of the one or more fourth images as described in operation 540 as illustrated in FIG. 5. The generation of the particular image may be similar to or the same as the generation of the second image as described in operation 530 as illustrated in FIG. 5 or according to process 600. For example, the particular image may be generated by processing an image in the image sequence based on a blood vessel model associated with the second imaging device. The reference image sequence may include multiple corrected image frames generated by performing a partial volume correction on the multiple image frames in the image sequence based on the particular image. The determination of the second reference image may be similar to or the same as the determination of the one or more corrected fourth images as described in operation 550 as illustrated in FIG. 5.

In 704, the processing device 120 (e.g., the model determination module 460) may determine a predicated output of a machine learning model in a current iteration for each group of training samples. The machine learning model in the current iteration may process the input images in each group of training samples (e.g., a first specific image, or a second specific image and a particular image). The machine learning model may extract one or more image features (e.g., a low-level feature (e.g., an edge feature, a texture feature), a high-level feature (e.g., a semantic feature), or a complicated feature (e.g., a deep hierarchical feature) included in the inputted image(s) (e.g., a first specific image, or a second specific image and a particular image). Based on the extracted image features, the machine learning model may determine the predicted output (e.g., a first predicted image generated based on the first specific image or a second predicted image generated based on the second specific image and the particular image) corresponding to the inputted image(s).

In 706, the processing device 120 (e.g., the model determination module 460) may determine a value of a cost function based on predicted outputs and desired outputs. As used herein, a cost function (or loss function) may refer to a function that measures a difference between the predicted output of the machine learning model and the desired output (i.e., an actual output), wherein the difference may indicate the accuracy of the machine learning model. The cost function may include a log loss function, a cross-entropy loss function, a least-squares function, an index loss function, etc.

In 708, the processing device 120 (e.g., the model determination module 460) may determine whether a termination condition is satisfied. The termination condition may provide an indication of whether the machine learning model is sufficiently trained. The termination condition may relate to a cost function or an iteration count of the training process. For example, the processing device 120 may determine a loss function of the machine learning model and determine a value of the cost function based on the difference between the estimated image and the actual image. Further, the processing device 120 may determine the termination condition is satisfied if the value of the loss function is less than a threshold. The threshold may be default settings of the imaging system 100 or may be adjustable under different situations. As another example, the termination condition may be satisfied if the value of the cost function converges. The convergence may be deemed to have occurred if the variation of the values of the cost function in two or more consecutive iterations is smaller than a threshold (e.g., a constant). As still another example, the processing device 120 may determine the termination condition is satisfied if a specified number (or count) of iterations are performed in the training process.

In response to a determination that the termination condition is satisfied, the processing device 120 may proceed to operation 714. In 714, the processing device 120 may designate the machine learning model in the current iteration as the trained machine learning model (e.g., a first trained machine learning model or a second trained machine learning model). On the other hand, in response to a determination that the termination condition is not satisfied, the processing device 120 may proceed to operation 710. In 710, the processing device 120 may update the machine learning model based on the value of the cost function. For example, the processing device 120 may update the value(s) of the learning parameter(s) of the machine learning model based on the value of the loss function according to, for example, a backpropagation algorithm.

In 712, the processing device 120 (e.g., the model determination module 460, the processing circuits of the processor 210) may designate the updated machine learning model in the current iteration as a machine learning model in a next iteration.

After 712, the processing device 120 may proceed to operation 702 to perform the next iteration until the termination condition is satisfied. In the next iteration, the processing device 120 may obtain multiple groups of training samples in another batch. The size of the batch may refer to a group count or number of the multiple groups of training samples. After the termination condition is satisfied in a certain iteration, the machine learning model in the certain iteration having the updated value(s) of the learning parameter(s) may be designated as the trained machine learning model (e.g., the first trained machine learning model or the second trained machine learning model).

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, in 610, the processing device 120 may also pre-process the specific image. As another example, one or more other optional operations (e.g., a storing operation) may be added elsewhere in the process 600. In the storing operation, the processing device 120 may store information and/or data (e.g., the multiple groups of training samples, the trained machine learning model, etc.) associated with the imaging system 100 in a storage device (e.g., the storage device 130) disclosed elsewhere in the present disclosure. It should be noted that the first trained machine learning model and the second trained machine learning model may be constructed based on machine learning models in the same type or different types. The first trained machine learning model and the second trained machine learning model may be trained using the same or different training algorithms.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, one or more other optional operations (e.g., a storing operation) may be added elsewhere in the process 700. In the storing operation, the processing device 120 may store information and/or data (e.g., a second training sample, the trained second machine learning model, etc.) associated with the imaging system 100 in a storage device (e.g., the storage device 130) disclosed elsewhere in the present disclosure.

EXAMPLES

The following examples are provided for illustration purposes and are not intended to limit the scope of the present disclosure.

Example 1 Exemplary PET Image of the Neck of a Subject

Figure 8:
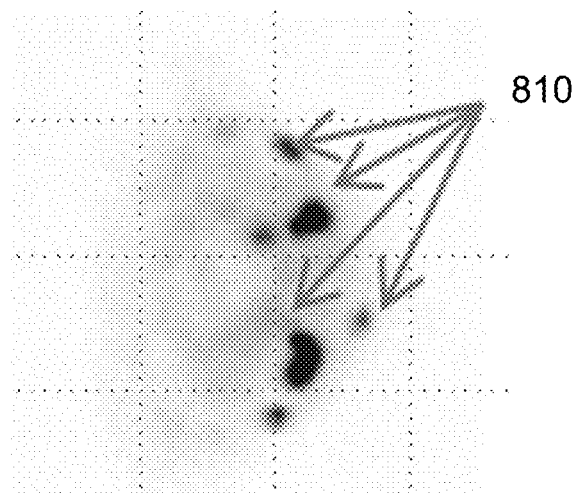
FIG. 8 shows an exemplary PET image obtained in an early time period after the injection of a tracer according to some embodiments of the present disclosure.

FIG. 8 shows an exemplary PET image obtained in an early time period after the injection of a tracer according to some embodiments of the present disclosure. The PET image as shown in FIG. 8 was reconstructed based on projection data generated by a PET device in an early time period, from 1_minute to 2 minutes after the tracer was injected into the subject. As shown in FIG. 8, the PET image includes representations of a plurality of carotid arteries 810. The concentration of the tracer (also referred to as the radioactivity activity) is high in the early time period after the tracer is injected into the patient. Therefore, the PET image acquired in the early time period (e.g., the first image as described in FIGS. 5-6) may have a better quality than other PET images acquired in other time periods after the injection of the tracer, thereby being used to determine a high image resolution image of the blood vessel (e.g., the second image as described in FIGS. 5-6).

Figure 9:
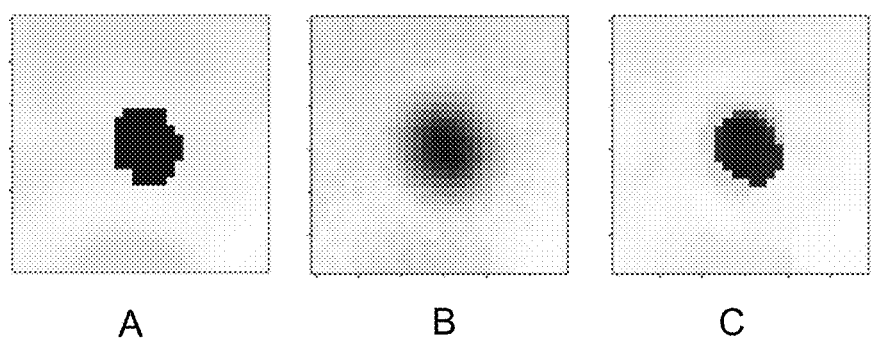
FIG. 9 shows PET images associated with a carotid artery of a subject according to some embodiments of the present disclosure.

Example 2 Exemplary PET Images Associated with a Carotid Artery of a Subject FIG. 9 shows PET images associated with a carotid artery of a subject according to some embodiments of the present disclosure. As shown in FIG. 9, image A is a true image (or desired image) of the carotid artery. The characteristics of the carotid artery represented in image A are substantially the same as the characteristics of the carotid artery in reality. Image B (e.g., the first image as described in FIGS. 5-6) is a blurry image of the carotid artery reconstructed based on projection data generated by a PET device in an early time period after the injection of a tracer. Image B may be also referred to as a low-image resolution image. Image C (e.g., the first image as described in FIGS. 5-6) was a reconstructed image generated by processing image B based on a blood vessel model as disclosed elsewhere in the present disclosure (e.g., FIGS. 5 and 6 and the descriptions thereof). Image C may be also referred to as a high-image resolution image. According to FIG. 9, the image resolution of image C is higher than the image resolution of image B, and the carotid artery represented in the image C is more similar or closer to the carotid artery represented in the image A than the carotid artery represented in the image B, indicating that using the blood vessel model, an image with improved image resolution and accuracy (e.g., image C) may be generated based on an image with a low image resolution (e.g., image B). For example, the shape of the carotid artery represented in image C is similar to the shape of the carotid artery presented in image A. The boundary of the carotid artery represented in image C is substantially continuous. The pixel values representing the carotid artery in image B appear uniform.

Figure 10:
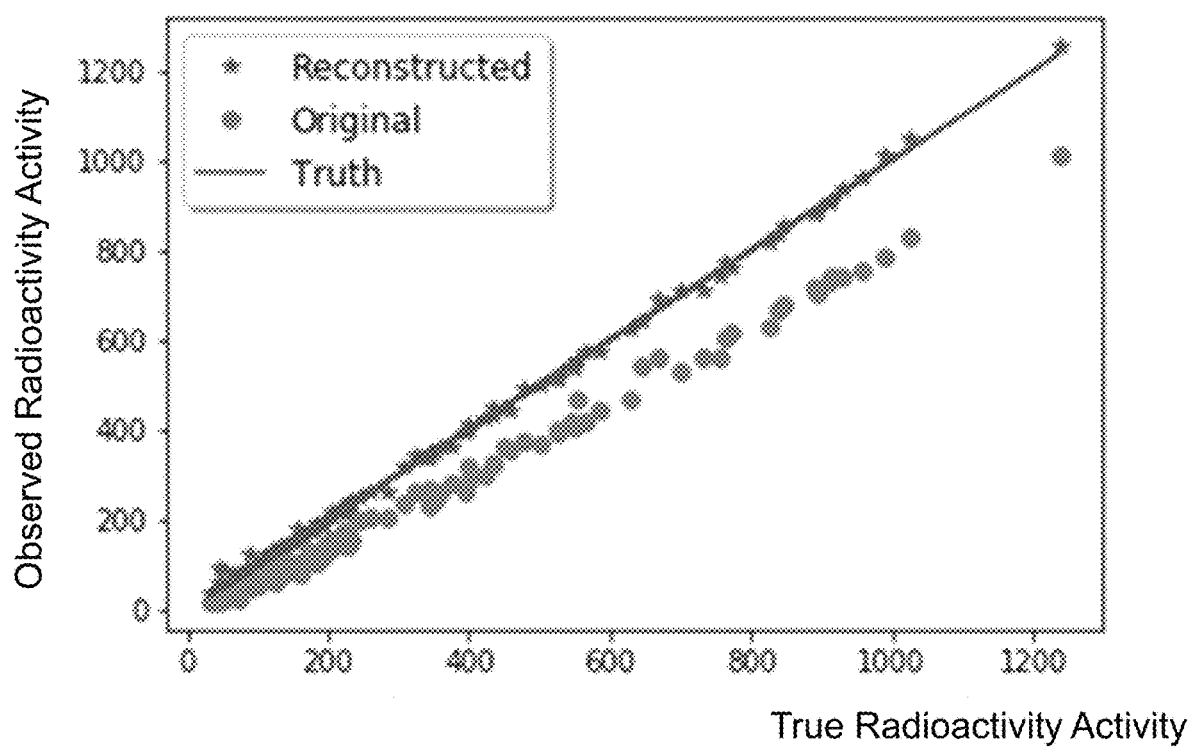
FIG. 10 shows radioactivity activities derived from images corrected based on different images according to some embodiments of the present disclosure.

Example 3 Exemplary Radioactivity Activities Derived from Images Corrected Based on Different Images FIG. 10 shows radioactivity activities derived from images corrected based on different images according to some embodiments of the present disclosure. As shown in FIG. 10, a dot denotes a radioactivity activity (i.e., observed radioactivity activity) of a tracer derived from an image corrected based on an original image (e.g., the first image as described in FIG. 5 or image B as described in FIG. 9) and a true radioactivity activity of the tracer in a blood vessel. An asterisk denotes an observed radioactivity activity of a tracer in a blood vessel derived from an image corrected based on a reconstructed image (e.g., the second image as described in FIG. 5 or image C as described in FIG. 9) and a true radioactivity activity of the tracer in the blood vessel. The line denotes a relationship between an observed radioactivity activity of a tracer in a blood vessel derived from an image corrected based on a true image (e.g., image A as described in FIG. 9) of the blood vessel and a true radioactivity activity of the tracer in the blood vessel. As illustrated in FIG. 10, the observed radioactivity activity of a tracer in a blood vessel derived from an image may be substantially equal to the true radioactivity activity of the tracer in the blood vessel. Specifically, the plurality of asterisks fit the line as FIG. 10 illustrates, which suggests that the radioactivity activity of a tracer in a blood vessel determined from a corrected image based on the reconstructed image (e.g., the second image as described in FIG. 5 or image C as described in FIG. 9) may be close to the true radioactivity activity of the tracer in the blood vessel, which in turn may improve the accuracy of a plasma input function determined based on the radioactivity activity. Accordingly, the systems and methods in the present disclosure may generate the reconstructed image (e.g., the second image as described in FIG. 5 or image C as described in FIG. 9) with a high image resolution based on the blood vessel model and perform a partial volume correction on PET images may obtain a plasma input function with improved accuracy.

Figure 11:
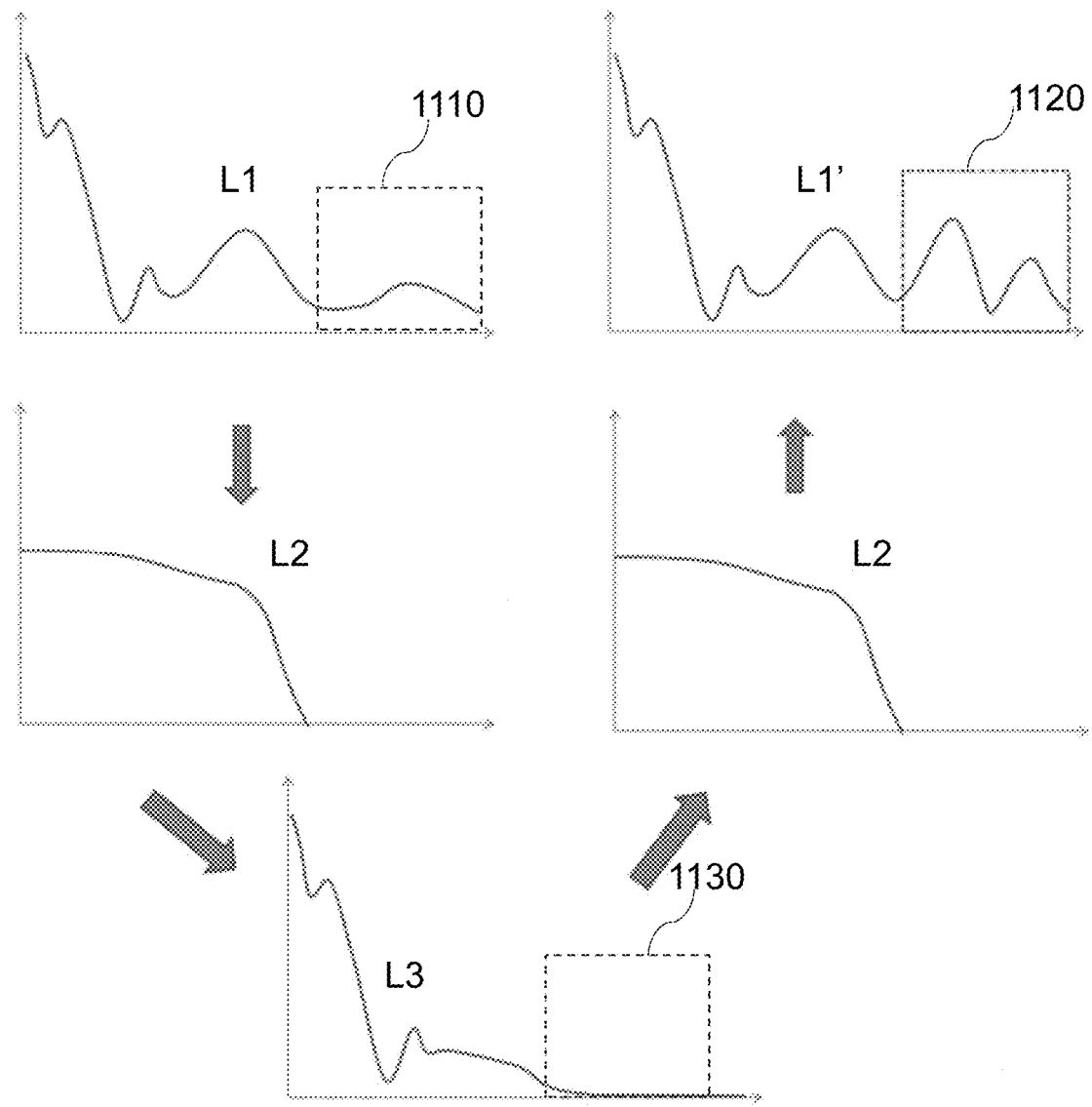
FIG. 11 is a diagram illustrating an exemplary process for reconstructing an image with high image resolution using a PSF model according to some embodiments of the present disclosure.

Example 4 Exemplary Process for Generating an Image with High Image Resolution Using a PSF Model FIG. 11 is a diagram illustrating an exemplary process for reconstructing an image with high image resolution using a PSF model according to some embodiments of the present disclosure. As illustrated in FIG. 11, curve L1 denotes a true image spectrum corresponding to a true image (e.g., image A as shown in FIG. 9) of a blood vessel. Curve L2 denotes a transfer function or resolution model (e.g., PSF) associated with a spatial resolution of an imaging device. Curve L3 denotes an image spectrum corresponding to an original image (e.g., image B as shown in FIG. 9) of the blood vessel acquired by a PET image with a spatial resolution described by the resolution model. Curve L1' denotes a reconstructed image spectrum corresponding to a reconstructed image of the blood vessel using the transfer function. The reconstructed image spectrum L1' was generated by performing a deconvolution operation on the image spectrum L3 using the transfer function. As a limitation of a spatial resolution of the imaging device, the image spectrum L3 deviates from the true image spectrum L1, i.e., some information is lost (e.g., shown as dotted frames 1110 and 1130). The reconstructed image spectrum L1' determined using the resolution model (e.g., the PSF of the imaging device) is also deviated from the true image spectrum L1. For example, the reconstructed image spectrum L1' includes an artifact, such as a Gibbs artifact (e.g., dotted frame 1120). Accordingly, using the deconvolution operation to improve an image resolution of an image (e.g., the first image as described in FIG. 5) based on the resolution model may obtain multiple estimated images (i.e., solutions) with high image resolution satisfying the resolution model, but the multiple estimated images may include a deviation from the true image.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer-readable media having computer-readable program code embodied thereon.

A non-transitory computer-readable signal medium may include a propagated data signal with computer readable program code embodied therein, for example, in baseband or as part of a carrier wave. Such a propagated signal may take any of a variety of forms, including electromagnetic, optical, or the like, or any suitable combination thereof. A computer-readable signal medium may be any computer-readable medium that is not a computer-readable storage medium and that may communicate, propagate, or transport a program for use by or in connection with an instruction execution system, apparatus, or device. Program code embodied on a computer-readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object-oriented programming language such as Java, Scala, Smalltalk, Eiffel, JADE, Emerald, C++, C #, VB. NET, Python or the like, conventional procedural programming languages, such as the "C" programming language, Visual Basic, Fortran, Perl, COBOL, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution, e.g., an installation on an existing server or mobile device.

Similarly, it should be appreciated that in the foregoing description of embodiments of the present disclosure, various features are sometimes grouped together in a single embodiment, figure, or description thereof to streamline the disclosure aiding in the understanding of one or more of the various inventive embodiments. This method of disclosure, however, is not to be interpreted as reflecting an intention that the claimed object matter requires more features than are expressly recited in each claim. Rather, inventive embodiments lie in less than all features of a single foregoing disclosed embodiment.

In some embodiments, the numbers expressing quantities, properties, and so forth, used to describe and claim certain embodiments of the application are to be understood as being modified in some instances by the term "about," "approximate," or "substantially." For example, "about," "approximate" or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/ or the like, referenced herein is hereby incorporated herein by this reference in its entirety for all purposes, excepting any prosecution file history associated with same, any of same that is inconsistent with or in conflict with the present document, or any of same that may have a limiting effect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

We claim:

1. A system, comprising:
at least one storage device storing executable instructions, and
at least one processor in communication with the at least one storage device, when executing the executable instructions, causing the system to perform operations including:
obtaining a first image acquired by an imaging device, the first image including a representation of a blood vessel of a subject based on a tracer;
obtaining a blood vessel model configured to provide one or more constraints regarding one or more characteristics of the blood vessel; and
generating, based on the blood vessel model and the first image, a second image including a representation of the blood vessel, an image resolution of the second image being higher than an image resolution of the first image, and the representation of the blood vessel in the second image satisfying at least one of the one or more constraints, wherein the image resolution of the first image is defined by a point spread function (PSF) model, and generating, based on the blood vessel model and the first image, a second image including a representation of the blood vessel includes:
generating, based at least in part on the PSF model and the first image, the second image, the second image being converted into the first image using the PSF model.

2. The system of claim 1, wherein the one or more constraints regarding one or more characteristics of the blood vessel include at least one of a first constraint, a second constraint, a third constraint, or a fourth constraint,
the first constraint includes that a size of the blood vessel exceeds the image resolution of the first image,
the second constraint includes that a cross-section of the blood vessel is approximately circular,
the third constraint includes that a boundary of the cross-section of the blood vessel is continuous, and
the fourth constraint includes that a concentration of the tracer in the blood vessel is uniform.

3. The system of claim 1, wherein generating, based at least in part on the PSF model and the first image, a second image including a representation of the blood vessel includes:
performing an iterative process, wherein each iteration of the iterative process includes:
determining, based on the PSF model and the first image, a third image having an image resolution higher than the image resolution of the first image;

determining, based on the third image and at least one of the second constraint, the third constraint, or the fourth constraint, an estimated second image;

determining whether a termination condition is satisfied; and based on a determination that whether the termination condition is satisfied, updating the first image using the estimated second image in response to the determination that the termination condition is not satisfied; or designating the estimated second image as the second image in response to the determination that the termination condition is satisfied and terminating the iterative process.

4. The system of claim 3, wherein to determine, based on the PSF model and the first image, a third image, the at least one processor is further configured to cause the system to perform the operations including:

performing, based on the PSF model, a deconvolution operation on the first image to obtain the third image.

5. The system of claim 3, wherein to determine, based on the third image and at least one of the second constraint, the third constraint, or the fourth constraint, an estimated second image, the at least one processor is further configured to cause the system to perform the operations including:

determining a pixel value threshold; and performing a smoothing operation on a region of the third image to obtain the estimated second image, the region of the third image including a continuous boundary and a plurality of pixels whose pixel values exceed the pixel value threshold.

6. The system of claim 3, wherein to determine, based on the third image and at least one of the second constraint, the third constraint, or the fourth constraint, an estimated second image, the at least one processor is further configured to cause the system to perform the operations including:

performing, based on a compressed sensing technique, a denoising operation on the third image to obtain the estimated second image.

7. The system of claim 3, wherein the termination condition relates to an iteration count of the iterative process, or a cost function configured to compare a difference between the first image and an estimated first image generated based on the estimated second image and the spatial resolution of the imaging device.

8. The system of claim 1, wherein to generate, based on the blood vessel model and the first image, a second image including a representation of the blood vessel, the at least one processor is further configured to cause the system to perform the operations including:

obtaining a trained machine learning model, the trained machine learning model being determined based on multiple groups of training samples, wherein each group of the multiple groups of training samples includes a specific image and a reference image both associated with a same blood vessel, and the first specific image is generated based on the PSF model; and generating the second image by inputting the first image into the trained machine learning model.

9. The system of claim 8, wherein the trained machine learning model is generated by a training process including training a machine learning model using the multiple groups of training samples, the reference image having a higher spatial resolution than the specific image, the specific image serves as an input of the machine learning model, and the reference image serves as a desired output of the machine learning model during the training process.

10. The system of claim 9, wherein the training process of the trained machine learning model includes:

initializing parameter values of the machine learning model; and for each group of the multiple groups of training samples, training the machine learning model by iteratively updating parameter values of the machine learning model.

11. The system of claim 1, wherein the at least one processor is further configured to cause the system to perform the operations including:

obtaining one or more fourth images associated with the blood vessel; and obtaining one or more corrected fourth images or a plasma input function associated with the blood vessel by performing, based on the second image, a partial volume correction on each of the one or more fourth images.

12. The system of claim 11, wherein the one or more fourth images are acquired by a positron emission tomography (PET) device via scanning the subject including the blood vessel in one or more consecutive time periods after a radioactive tracer is injected into the subject.

13. The system of claim 12, wherein the one or more fourth images include the first image, and the first image is acquired by the PET device via scanning the subject including the blood vessel in a time period earlier than a portion of the one or more consecutive time periods after the radioactive tracer is injected into the subject.

14. The system of claim 11, wherein to obtain one or more corrected fourth images or a plasma input function by performing a partial volume correction on each of the one or more fourth images, the at least one processor is further configured to cause the system to perform the operations including:

obtaining a second trained machine learning model for partial volume correction; and determining the one or more corrected fourth images or the plasma input function associated with the blood vessel by inputting the second image and the one or more fourth images into the second trained machine learning model.

15. The system of claim 14, wherein obtaining a second trained machine learning model for partial volume correction includes:

obtaining multiple groups of second training samples; and generating the second trained machine learning model by training a second machine learning model using the multiple groups of second training samples in a second training process, wherein each group of the multiple groups of second training samples includes a second specific image, a second reference image generated by performing the partial volume correction on the second specific image, and a particular image, and during the second training process, the second specific image and the particular image serve as an input of the second machine learning model, and the second reference image serves as a desired output of the second machine learning model.

16. The system of claim 15, wherein generating the second trained machine learning model for partial volume correction by training a second machine learning model using the multiple groups of second training samples includes:

initializing parameter values of the second machine learning model; and for each group of the multiple groups of second training samples, training the second machine learning model by iteratively updating parameter values of the second machine learning model.

17. A method implemented on a computing device including at least one processor and at least one storage medium, and a communication platform connected to a network, the method comprising:

obtaining a first image acquired by an imaging device, the first image including a representation of a blood vessel of a subject based on a tracer;

obtaining a blood vessel model configured to provide one or more constraints regarding one or more characteristics of the blood vessel; and generating, based on the blood vessel model and the first image, a second image including a representation of the blood vessel, an image resolution of the second image being higher than an image resolution of the first image, and the representation of the blood vessel in the second image satisfying at least one of the one or more constraints, wherein the image resolution of the first image is defined by a point spread function (PSF) model, and generating, based on the blood vessel model and the first image, a second image including a representation of the blood vessel includes:

generating, based at least in part on the PSF model and the first image, the second image, the second image being converted into the first image using the PSF model.

18. The method of claim 17, wherein the one or more constraints regarding one or more characteristics of the blood vessel include at least one of a first constraint, a second constraint, a third constraint, or a fourth constraint, the first constraint includes that a size of the blood vessel exceeds the image resolution of the first image;

the second constraint includes that a cross-section of the blood vessel is approximately circular, the third constraint includes that a boundary of the cross-section of the blood vessel is continuous, and the fourth constraint includes that a concentration of the tracer in the blood vessel is uniform.

19. A non-transitory computer readable medium, comprising executable instructions that, when executed by at least one processor, direct the at least one processor to perform a method, the method comprising:

obtaining a first image acquired by an imaging device, the first image including a representation of a blood vessel of a subject based on a tracer;

obtaining a blood vessel model configured to provide one or more constraints regarding one or more characteristics of the blood vessel; and generating, based on the blood vessel model and the first image, a second image including a representation of the blood vessel, an image resolution of the second image being higher than an image resolution of the first image, and the representation of the blood vessel in the second image satisfying at least one of the one or more constraints, wherein the image resolution of the first image is defined by a point spread function (PSF) model, and generating, based on the blood vessel model and the first image, a second image including a representation of the blood vessel includes:

generating, based at least in part on the PSF model and the first image, the second image, the second image being converted into the first image using the PSF model.

* * * * *